United States Patent
Alawieh

(10) Patent No.: US 11,187,775 B2
(45) Date of Patent: Nov. 30, 2021

(54) TIME OF ARRIVAL (TOA) MEASUREMENTS

(71) Applicant: Fraunhofer-Gesellschaft zur Foerderung der angewandten Forschung e.V., Munich (DE)

(72) Inventor: Mohammad Alawieh, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 245 days.

(21) Appl. No.: 16/395,127

(22) Filed: Apr. 25, 2019

(65) Prior Publication Data

US 2019/0250241 A1  Aug. 15, 2019

Related U.S. Application Data

(63) Continuation of application No. PCT/EP2017/077328, filed on Oct. 25, 2017.

(30) Foreign Application Priority Data

Oct. 28, 2016 (EP) .................................. 16196384

(51) Int. Cl.
 *G01S 11/02* (2010.01)
 *G01S 11/14* (2006.01)
  (Continued)

(52) U.S. Cl.
 CPC ............ *G01S 5/0221* (2013.01); *G01S 5/021* (2013.01); *G01S 5/04* (2013.01); *G01S 11/00* (2013.01);
  (Continued)

(58) Field of Classification Search
 CPC ....... G01S 11/02; G01S 5/0205; G01S 5/0218
 See application file for complete search history.

(56) References Cited

U.S. PATENT DOCUMENTS 5,828,694 A * 10/1998 Schipper .............. H04B 1/7085
                                                      375/150
6,118,808 A    9/2000 Tiemann et al.
         (Continued)

FOREIGN PATENT DOCUMENTS

JP        2002511200 A     4/2002
JP         4048566 B2     12/2007
           (Continued)

OTHER PUBLICATIONS

"Technical Specification", 36.355 3GPP LTE Positioning Protocol (LPP) (Release 13) 3rd Generation Partnership Project, 3rd Generation Partnership Project, 2016.
(Continued)

*Primary Examiner* — Gregory C. Issing
(74) *Attorney, Agent, or Firm* — Perkins Coie LLP; Michael A. Glenn

(57) ABSTRACT

There is provided a method and/or an apparatus for time of arrival, TOA, measurements. One method includes: performing, at a sample resolution, a correlation process on a received measurement signal to achieve a measurement correlation function; determining a peak sample and correlation data of at least one additional sample preceding and/or following the peak sample in the measurement correlation function; determining a TOA and/or distance on the basis of the peak sample and correction data acquired by at least the correlation data of the at least one additional sample preceding and/or following the peak sample and pre-assigned configuration data associated to the transmission channel acquired at a subsample resolution.

27 Claims, 20 Drawing Sheets

(51) Int. Cl.
*G01S 5/02* (2010.01)
*G01S 11/00* (2006.01)
*G01S 5/04* (2006.01)
G01S 5/14 (2006.01)
G01S 13/74 (2006.01)
H04L 5/14 (2006.01)

(52) U.S. Cl.
CPC ............. *G01S 11/02* (2013.01); *G01S 11/14* (2013.01); *G01S 5/14* (2013.01); *G01S 13/74* (2013.01); *H04L 5/14* (2013.01)

(56) References Cited

U.S. PATENT DOCUMENTS

| | | | |
|---|---|---|---|
| 6,469,665 B2* | 10/2002 | Porcino | G01S 5/14 |
| | | | 342/387 |
| 7,054,126 B2 | 5/2006 | Strutt et al. | |
| 7,085,537 B2* | 8/2006 | Fernandez-Corbaton | |
| | | | G01S 5/0215 |
| | | | 375/E1.032 |
| 7,095,813 B2* | 8/2006 | Amerga | G01S 19/428 |
| | | | 375/343 |
| 7,391,368 B1* | 6/2008 | Gao | G01S 5/0215 |
| | | | 342/387 |
| 7,466,752 B2* | 12/2008 | Zhengdi | G01S 5/0027 |
| | | | 342/357.63 |
| 7,474,994 B2* | 1/2009 | Fernandez-Corbaton | |
| | | | G01S 5/02 |
| | | | 375/343 |
| 7,627,063 B2* | 12/2009 | Hofmann | H04B 1/70752 |
| | | | 375/343 |
| 7,653,004 B2 | 1/2010 | Strutt | |
| 8,411,726 B2* | 4/2013 | Abraham | G01S 5/0205 |
| | | | 375/142 |
| 8,489,098 B2 | 7/2013 | Wigren et al. | |
| 2003/0123408 A1* | 7/2003 | Saitou | H04B 1/7075 |
| | | | 370/335 |
| 2003/0227895 A1 | 12/2003 | Strutt et al. | |
| 2004/0147239 A1 | 7/2004 | Zhengdi | |
| 2007/0121679 A1 | 5/2007 | Strutt | |
| 2008/0137524 A1 | 6/2008 | Anderson et al. | |
| 2010/0304708 A1* | 12/2010 | McCrady | G01S 5/0215 |
| | | | 455/404.2 |
| 2011/0207477 A1 | 8/2011 | Siomina et al. | |
| 2012/0032855 A1* | 2/2012 | Reede | G01S 13/82 |
| | | | 342/458 |

FOREIGN PATENT DOCUMENTS

| | | |
|---|---|---|
| JP | 2008051681 A | 3/2008 |
| JP | 2009186240 A | 8/2009 |
| JP | 2010512541 A | 4/2010 |
| JP | 2012518170 A | 8/2012 |
| JP | 2015514979 A | 5/2015 |
| WO | 2004051302 A1 | 6/2004 |
| WO | 2006063768 A1 | 6/2006 |
| WO | 2013142946 A1 | 10/2013 |

OTHER PUBLICATIONS

Cespedes, I. et al., "Methods for estimation of subsample time delays of digitized echo signals", Ultrasonic imaging 17.2 (1995): 142-171, 1995, pp. 142-171.

Fischer, Sven, "Observed Time Difference Of Arrival (OTDOA) positioning in 3GPP LTE", Qualcomm White Pap, (20140600), vol. 1, pp. 1-62, Jun. 6, 2014, pp. 1-62.

Konig, Stefan et al., "Precise Time of Flight Measurements in IEEE 802.11 Networks by Cross-Correlating the Sampled Signal with a Continuous Barker Code", Mobile Adhoc and Sensor Systems (MASS), 2010 IEEE 7th International Conference On, IEEE, Piscataway, NJ, USA, (Nov. 8, 2010), ISBN 978-1-4244-7488-2, pp. 642-649, XP031832058 [X] 41,70 * paragraph [0IV.]; figures 9,12 * [Y] 1-22,32-53,63-70, 2010, 642-649.

* cited by examiner

TIME OF ARRIVAL (TOA) MEASUREMENTS

CROSS-REFERENCES TO RELATED APPLICATIONS

This application is a continuation of copending International Application No. PCT/EP2017/077328, filed Oct. 25, 2017, which is incorporated herein by reference in its entirety, and additionally claims priority from European Application No. EP 16196384.8, filed Oct. 28, 2016, which is incorporated herein by reference in its entirety.

BACKGROUND OF THE INVENTION

Time of arrival (TOA) operations may permit to estimate distances of a transmitter which sends a transmission (e.g., radio-frequency transmissions or ultrasound transmissions) from a receiver which receives the transmissions. TOA estimations may be obtained by correlating a received signal with a stored signal and by retrieving a sample which carries the peak value of a correlation function.

TOA estimations may have a resolution (e.g., expressed in meters) limited by the sampling rate. The higher the sampling rate, the higher the resolution. As the sampling rate cannot be infinite, the maximum resolution is limited.

U.S. Pat. No. 7,653,004 B2 discloses a method for performing a TOA measurement. According thereto, a correlation is first identified by comparing the received correlation profile with different reference correlation functions. On the basis of the comparison, the TOA is corrected by an estimated phase delay.

WO 2006063768 A1 discloses a method for performing a TOA measurement from the inflection edge of a correlation profile.

U.S. Pat. No. 7,054,126 B2 discloses a method for performing a TOA measurement using square-root raised-cosine pulse shaping and chip matched filters on direct sequence spreading waveforms.

SUMMARY

According to an embodiment, a method for time of arrival, TOA, measurements may have the steps of: performing, at a sample resolution, a correlation process on a received measurement signal to obtain a measurement correlation function; determining a peak sample and correlation data of at least one additional sample preceding and/or following the peak sample in the measurement correlation function; determining a TOA and/or distance on the basis of the peak sample and correction data obtained by at least the correlation data of the at least one additional sample preceding and/or following the peak sample and pre-assigned configuration data associated to the transmission channel obtained at a subsample resolution.

According to another embodiment, a device may have: a TOA or distance estimation unit for estimating, at sample resolution, a TOA or a distance from a position of the peak in a correlation function obtained by processing a received signal, wherein the sample resolution is associated to the sampling time of the received signal and/or correlation function; and a correction unit to modify the estimated TOA or distance on the basis of at least correlation data of at least one of the samples preceding and/or following the sample with the maximum value of the correlation function and pre-assigned configuration data having a subsample resolution, the configuration data being obtained by: performing a plurality of correlation processes for a plurality of configuration signals to obtain multiple configuration correlation functions associated to different distances at the subsample resolution; for each configuration correlation process, determining the peak sample and data of one sample preceding and/or one sample following the peak sample for each correlation; and associating configuration data to the transmission channel to obtain pre-assigned configuration data.

According to another embodiment, a non-transitory digital storage medium may have a computer program stored thereon to perform the inventive method when said computer program is run by a computer.

According to examples, there is provided a method for time of arrival, TOA, measurements, comprising:
performing, at a sample resolution, a correlation process on a received measurement signal to obtain a measurement correlation function;
determining a peak sample and correlation data of at least one additional sample preceding and/or following the peak sample in the measurement correlation function;
determining a TOA and/or distance on the basis of the peak sample and correction data obtained by at least the correlation data of the at least one additional sample preceding and/or following the peak sample and pre-assigned configuration data associated to the transmission channel obtained at a subsample resolution.

The correlation data (e.g., correlation values) of the samples preceding and/or following the peak sample have information regarding the TOA and/or distance which is even more accurate that the information that may be obtained by simply identifying the peak in the correlation function. The correlation data may be adapted to the environment using pre-assigned configuration data. A "subsample" resolution may be obtained, i.e., a resolution (e.g., in terms of distances that may be determined) that goes beyond the maximum resolution possible with the sampling rate of receiver when sampling the received signal.

According to an aspect, the pre-assigned configuration data vary according to the distance.

Accordingly, it is possible to obtain precise information on the basis of the distance estimated by retrieving the correlation peak.

According to an aspect, there is provided transforming the correlation data of the at least one additional sample preceding and/or following the peak sample (according to a transformation function obtained experimentally.

Accordingly, it is possible to adapt the correction data to the transmission channel.

According to an aspect, there is provided a configuration session obtaining a plurality of data from configuration signals received from a plurality of different distances, to obtain pre-assigned configuration data in association to distances or time delays.

Accordingly, the pre-assigned data may be extremely precise.

According to an aspect, there is provided using pre-assigned configuration data with a resolution greater than the resolution of the determining step to estimate the a TOA and/or distance.

Accordingly, precision may be further increased. Notably, as the correlation data on the samples close to the peak sample provide information at a subsample resolution, the pre-assigned configuration data may also have a subsample resolution, which permits to increase the accuracy of the distance data obtained by the correlation data of the samples close to the peak sample.

According to an aspect, the at least one additional sample preceding and/or following the peak sample comprises at least the sample immediately preceding the peak sample, and/or at least the sample immediately following the peak sample, and/or a sample preceding or following the peak sample of a determined number of samples.

These samples may provide particularly accurate information on the real distance and/or TOA.

According to an aspect, it is possible to provide a configuration session comprising:

performing a plurality of correlation processes for a plurality of configuration signals to obtain multiple configuration correlation functions associated to different distances at a subsample resolution;

for each configuration correlation process, determining the peak sample and data of at least one sample preceding and/or following the peak sample for each correlation;

associating configuration data to the transmission channel.

Accordingly, it is possible to obtain precise configuration data from the configuration session, the configuration data being at a subsample resolution.

According to an aspect, a configuration session may a simulation session, e.g., in which the received signals are simulated over a simulated channel simulating the features of the transmission channel.

According to an aspect, there is provided (in the configuration session and/or in the operation session) comparing and/or measuring the difference between the correlation value of a sample preceding the peak sample with the correlation value of a sample following the peak sample, and/or comparing or calculating a ratio between:

the difference between the correlation value of a sample preceding the peak sample and the correlation value of a sample following the peak sample; and the sum of the correlation value of a sample preceding the peak sample and the correlation value of a sample following the peak sample.

The quotient:

$$\frac{R(i+1) - R(i-1)}{R(i+1) + R(i-1)}$$

may provide accurate information on the real distance and/or TOA of the received signal. This quotient may be calculated, in the measurement session, in the step of determining the TOA and/or the distance. This quotient may additionally or alternatively calculated in the configuration session, to obtain accurate information on the transmission channel.

According to an aspect, there is provided a method for performing difference time of arrival measurements, TDOA, comprising measuring a first TOA for a first transmission, a second TOA for a second transmission, and measuring a distance by subtracting the first TOA from the second TOA, wherein at least one of the measurements are performed with a method according to examples above and/or below.

According to an aspect, there is provided a method for performing round trip time, RTT, measurements, comprising transmitting a first signal from a first device to a second device, transmitting a second signal from the second device to the first device, and performing the method one of the examples above and/or below for calculating the distance between the first and the second devices for at least the first and/or the second signals.

According to an aspect, there is provided a device comprising:

a TOA or distance estimation unit for estimating, at first resolution, a TOA or a distance from a position of the peak in a correlation function obtained by processing a received signal, wherein the first resolution is associated to the sampling time of the received signal and/or correlation function; and a correction unit to modify the estimated TOA or distance on the basis of at least correlation data of at least one of the samples preceding and/or following the sample with the maximum value of the correlation function and pre-assigned configuration data having a resolution higher than the first resolution.

According to an aspect, the device may perform one of the methods discussed above and/or below.

According to an aspect, there is provided a storage device containing pre-assigned configuration data to be combined to the correlation data of at least one of the samples preceding and/or following the sample with the peak to adapt a measurement to the transmission channel.

According to an aspect, there is provided a system comprising a transmitter and a receiver (e.g., one of the devices above and/or below) and is to measure a TOA of a signal received from the transmitter at least in the determining step or in the configuration session.

Accordingly, the examples above and below have low complexity (e.g., in terms of resource utilization, such as the number of additions, multiplications, and so on, which are to be processed) with respect to methods according to conventional technology.

Further, no correlation data are distorted, hence accuracy is increased.

In some examples, the sampling rate of the signals transmitted/received in the configuration session is the same of the sampling rate of the signals transmitted/received in the measurement (operation) session. Notwithstanding, information may be obtained at a subsample resolution by performing a great number of configuration measurements in the configuration session.

According to an example, it is possible to perform real configuration measurements in the configuration session using a hardware chain for the transceiver. Cables of different length may be used for this configuration session to get a correlation profile at each length. The cable may directly connect the transmitter to the receiver output. The exact signal propagation time for each cable may be controlled with a measurement instrument set at the defined carrier frequency. The transmitter and the receiver may be synchronized. The number of cables used may be related to the number of subsamples (K). Accordingly, pre-assigned configuration data may be calculated for each measurement with a different cable length. Knowing the exact signal propagation time for each cable, In some examples, there is provided comparing and/or measuring the difference between the correlation value of a sample preceding the peak sample with the correlation value of a sample following the peak sample, and/or calculating ratio between:

the difference between the correlation value of a sample following the peak sample and the correlation value of a sample preceding the peak sample; and the sum of the correlation value of a sample following the peak sample and the correlation value of a sample preceding the peak sample.

In some examples, there is provided, in the configuration session performed at a subsample resolution calculating a ratio between:

the difference between the correlation value of a sample following the peak sample (and the correlation value of a sample preceding the peak sample; and the sum of the correlation value of a sample following the peak sample and the correlation value of a sample preceding the peak sample.

In some examples, there is provided obtaining the pre-assigned configuration data from a fitting function.

In some examples, there is provided obtaining the pre-assigned configuration data from a linear function.

In some examples, there is provided configuration data using a quadratic function.

In some examples, there is provided collecting the pre-assigned configuration data from a plurality of TOAs and/or distances at mutual distances smaller than the measurement resolution associated to the sampling rate, to adapt to the transmission channel to the correlation data associated to the samples preceding and/or following the peak sample.

In some examples, there is provided adapting data obtained by the samples preceding and/or following the peak sample with data associated to the transmission channel obtained at a subsampling resolution.

In some examples, the pre-assigned configuration data include a linear or quadratic function.

In some examples, the linear or quadratic function is obtained by inference, interpolation, least square method, or other statistical methods.

In some examples, there is provided the linear or quadratic function transforms data from a measurement correlation function into data which keep into account the features of the environment.

In some examples, the configuration data comprise a slope of a linear function.

In some examples, there is provided obtaining a quotient associated to a sample preceding the peak sample and the sample following the peak sample in the correlation function, and adapting the quotient to the channel conditions.

In some examples, there is provided translating quotient associated to the sample preceding the peak sample and the sample following the peak sample in the correlation function by a preassigned configuration data "b".

In some examples, there is provided scaling a quotient associated to the sample preceding the peak sample and the sample following the peak sample in the correlation function by a preassigned configuration data "a".

In some examples, there is provided obtaining a value a quotient corrIndex associated to the sample preceding the peak sample and the sample following the peak sample in the correlation function obtaining the correction data on the basis of $$\text{correction data} = \left(\frac{corrIndex}{a} - \frac{b}{a}\right)$$

where "a" and "b" are pre-assigned configuration data.

In some examples, "a" and "b" are coefficients obtained from a fitting function obtained in the configuration session.

In some examples, there is provided determining a TOA by

Final_TOA=estimated_TOA+(Correction−$K$/2)/$K$, where estimated_TOA is the estimated TOA, Correction is the correction data, and K is a constant associated to the number of subsamples of the configuration session.

In some examples, there is provided, in the configuration session, performing configuration session correlations associated to different subsamples "k", and, for each configuration session obtaining a quotient corrIndex(k) associated to the at least one sample preceding the peak sample and the at least one sample following the peak sample; and projecting different corrIndex(k) to obtain a fitting function which approximates the different data obtained in the configuration session.

In some examples, there is provided obtaining pre-assigned configuration data as coefficients "a" and "b" from the fitting function.

In some examples, the subsample resolution is so that the pre-assigned configuration data are obtained at different positions which are within the sample resolution.

In some examples, the received measurement signal is a signal transmitted in an long term evolution, LTE, network or a 4G or 5G network.

In some examples, the received measurement signal is a signal received from a satellite and/or a Galileo system.

In some examples, the steps of performing and determining a peak sample and correlation data of at least one additional sample preceding and/or following the peak sample in the measurement correlation function are performed by a first device, and the steps of determining a TOA and/or distance is performed by a remote device.

In some examples, the first device is a user equipment, UE, and the second device is a location server, or a base station, or a evolved node, eNB, or a gNB (next Generation NodeB in 5G).

In some examples, there is provided measuring TDOAs obtained by transmissions received from a plurality of base stations.

In some examples, there is provided performing RTT measurement according to a D2D or V2V protocol to obtain the mutual distance between to UEs, wherein at least one UEs performs the steps of performing and determining a peak sample and correlation data of at least one additional sample preceding and/or following the peak sample in the measurement correlation function are performed by a first device.

In some examples, there is provided using a full-duplex communication device, the method comprising, before the step of performing:

transmitting and receiving the transmitted signal in a full-duplex operation; and, after the step of determining a TOA, obtaining the delays associated to internal components of the full-duplex communication device.

In some examples, there is provided compensating the internal delays of the full-duplex communication device.

In some examples, there is provided a device configured to obtain the peak sample and data associated to the samples preceding and/or following the peak sample from a remote device.

In some examples, there is provided a full-duplex device configured to obtain delays associated to its internal components by transmitting and simultaneously receiving the same signal.

In some examples, there is provided a device configured so that the at least one additional sample preceding and/or following the peak sample comprises at least the sample immediately preceding the peak sample, and/or at least the sample immediately following the peak sample.

In some examples, there is provided a system comprising a transmitter and a receiver, wherein the receiver is to measure a TOA of a signal received from the transmitter at least in the determining step or in the configuration session.

In some examples, there is provided a device comprising non-transitory storage means which contain processor readable instructions which, when performed by a processor, cause the processor to perform any of the methods below or above.

In some examples, there is provided a method for configuring a device comprising:
performing a plurality of correlation processes for a plurality of configuration signals to obtain multiple configuration correlation functions associated to different distances at a subsample resolution;
for each configuration correlation process, determining the peak sample and data of at least one sample preceding and/or following the peak sample for each correlation; associating configuration data to the transmission channel.

In some examples, there is provided a device for defining configuration data from a received measurement signal, further comprising:
a correlation unit for correlating the received measurement signal with a reference signal to obtain a configuration correlation function; and
a sample determination unit to determine a peak sample of the measurement correlation function and data from other samples, such as a sample preceding the peak sample and/or a sample following the peak sample,
and a configuration data definition unit obtaining the peak sample and the other samples to provide configuration data.
in some examples, there is provided a device as above and/or below, wherein the device is calibrated by:
performing a plurality of correlation processes for a plurality of configuration signals to obtain multiple configuration correlation functions associated to different distances at a subsample resolution;
for each configuration correlation process, determining the peak sample and data of at least one sample preceding and/or following the peak sample for each correlation;
associating configuration data to the transmission channel.
in some examples, there is provided a method for configuring a device, the method comprising:
performing a plurality of correlation processes for a plurality of configuration signals to obtain multiple configuration correlation functions associated to different distances at a subsample resolution;
for each configuration correlation process, determining the peak sample and data of at least one sample preceding and/or following the peak sample for each correlation; associating configuration data to the transmission channel.

In this document, transmissions and/or signals may be, for example, radio-frequency and/or ultrasound transmission and/or signals.

The transmitter and/or the receiver may be, for example, movable and/or may be engaged to moving means. The transmitter and/or the receiver may be, for example, engaged to a satellite.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
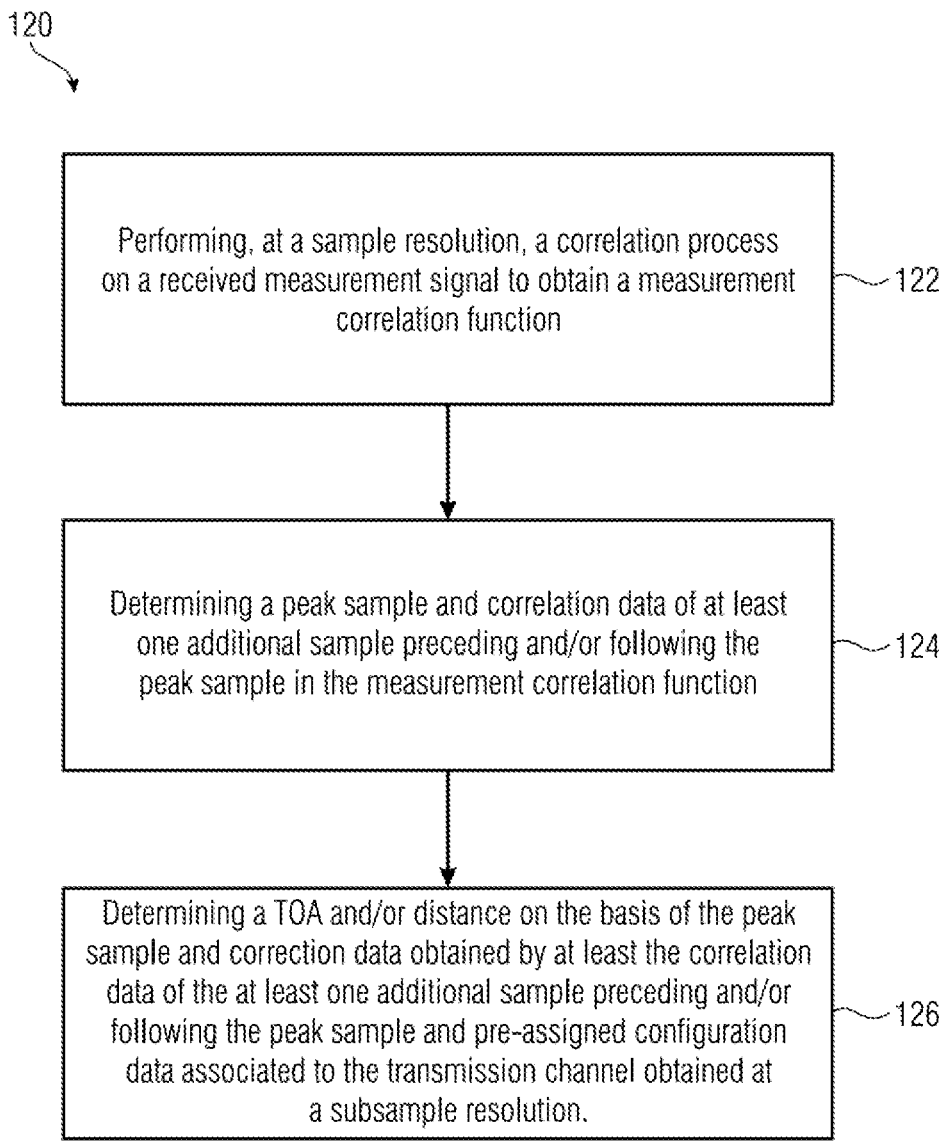
FIG. 1A shows a method according to an example.

FIG. 1A shows a method 120. The method 120 may be used to perform measurements using a TOA technique. The method 120 may use configuration data which may have been obtained, for example, in a preceding method, e.g., in a configuration (offline) session 110 (shown in FIG. 1E). Reference numeral 100 in FIG. 1E refers to a sequence of methods 110 and 120. The method 110 may be performed (even days or years) before the start of method 120.

The method 120 may comprise an operation session during which TOA measurements are performed and/or prepared. The method 120 may use pre-assigned configuration data. The configuration data may be data obtained using a configuration session such as a session defined by the method 110, for example.

The method 120 may be performed on a measurement signal which has (when received) a sampling rate (measurement sampling rate). For example, a transmission received from a transmitter may be sampled at the sampling rate. The sampling rate may be such that a measurement received signal is processed as a succession of discrete samples (each sample associated to a particular time instant). Therefore, a received signal may be represented as a succession of samples (e.g., 0, 1, 2, . . . , i−1, i, i+1, . . . , I), each of which is associated to a value (which may be connected, for example, to electromagnetic or ultrasound magnitudes), which received by the receiver by sampling (the received signal may be physically obtained by an antenna). The received signals may be processed, e.g., using a digital signal processor (DSP) or another computing device, to obtain data which may permit to obtain a measurement of the TOA (time delay of a transmission), which is connected to the environment (transmission channel).

The sampling time is associated to a resolution. In fact, the time delays and/or the distances that that may be recognized are discrete in number.

At step 122, a correlation process (cross-correlation) may be performed on a received measurement signal. A correlation function (measurement correlation function) may be derived. A peak sample may be determined in the measurement correlation function to permit an estimation of a TOA and/or a distance associated to the received signal.

An example of correlation (cross-correlation) may be provided by the formula $$R_{xy}[i] = \sum_{k=0}^{l-1} y[i+k]x^*[k]$$

where "l" is the reference code length in samples and "i" is a value which indicates how far y shall be shifted so that y and x correspond. $\chi^*$ is the complex conjugate of $\chi$. Here, the sign R(i) may be used instead of $R_{xy}[i]$ for simplicity. When the maximum or a peak of the correlation profile is named, reference may be made to the peak of the absolute value (e.g., only a positive value). The correlation function quantifies how y[i+k] and x[k] matches and is associated to a probability of the two functions being in phase. In general terms, the correlation may have a sampling rate which may be the same of (or may be associated to) the received measurement signal. A synchronization of the signals may be a prerequisite to perform the correlation.

Notably, the resolution achievable by the correlation processes is bounded to the distance between adjacent samples. If, for example, the distance between sample i–1 (at instant $t_1$) and i (at instant $t_2$) is 10 ns, information is provided for instants $t_1$ and $t_2$, but the correlation does not give the same accurate information on different instants (such as, for example, $t_1 < t < t_2$).

At step 124, a peak sample may be retrieved in the correlation function. The peak sample may directly associate the measurement received signal to a distance (e.g., between the antenna of the transmitter and the antenna of the receiver). In particular, it is possible to estimate a TOA by determining the peak sample, which is the sample (in the succession of samples of the correlation profile) which has the maximum value (e.g., the maximum absolute value). The information provided by the correlation (and the estimated TOAs and distances, as well) may have a maximum resolution, which may be bounded to the sampling rate of the received measurement signal. The fact that the resolution is limited (maximum achievable resolution) may, for example, cause a granularity of distances. In general terms:

the higher the sample rate;
the lower the time distance between different samples in the received signal;
the higher the resolution (and the accuracy);
the lower the time distance between different TOAs (time delays) that may be measured; and
the lower the length between different distances which may be estimated with a TOA measurement.

For example, when a receiver estimates the distance of a transmitter which moves towards the receiver, at a first instant the peak value in the correlation profile may be retrieved at an $i^{th}$ sample (associated to a particular TOA and/or a particular distance), while at a second instant the peak value may be retrieved at an $(i+1)^{th}$ sample (associated to another TOA and/or another distance), but the determination of the peak values, as such, does not give information on the signal time of flight (TOF) at an instant intermediate between the sample and the $(i+1)^{th}$ sample (and, therefore, does not give information on the distance of receiver form the transmitter). Therefore, a peak sample determination, as such, estimates a TOF whose resolution is limited by the sampling rate (coarse estimation). Therefore, at least at step 124, additional data, other than the position of the peak in the correlation profile, are collected from the correlation profile to correct the estimation that may be computed using the peak sample determination.

At step 124, correlation data of at least one additional sample preceding and/or following the peak sample in the measurement correlation function may be determined. For example, it is possible to determine the sample immediately preceding the peak sample and/or the sample immediately following the peak sample. The immediately preceding or following sample may be the sample which precedes or follows the peak sample of just one sample in the measurement received function (adjacent samples). For example, if a received function is received as a succession of 1, 2, . . . , i–1, i, i+1, . . . , I, samples, and the peak sample is the $i^{th}$ sample of the succession, the immediately preceding sample is the $(i-1)^{th}$ sample, while the immediately following sample is the $(i+1)^{th}$ sample. If the samples of the received function are acquired every 10 ns, the time delay from the immediately preceding/following samples and the peak sample is, therefore, 10 ns. The correlation values and/or data may also be obtained in step 124. For example, the correlation value of the peak and/or the correlation values of at least one of the samples i–2, i–1, i, i+1, i+2 may be collected.

At step 124, values associated to the correlation values of the at least one additional sample preceding and/or following the peak sample may be retrieved. For example, a value (or modified versions thereof, such as a normalized value) of the correlation function at the at least one additional sample preceding and/or following the peak sample may be retrieved. A difference between a correlation value of a sample preceding the peak value and a correlation value of a sample following the peak value may be obtained. The difference may be an algebraic difference, so as the sign ("+" or "−") may be taken in account. A sum of a correlation value of a sample preceding the peak value and a correlation value of a sample following the peak value may be performed. A quotient (e.g., of a difference between the correlation value of a sample preceding the peak value and a correlation value of a sample following the peak value at the numerator, divided by a sum of a correlation value of a sample preceding the peak value and a correlation value of a sample following the peak value at the denominator) may be calculated. For example, if a correlation value is R(i) at the peak sample i, the quotient (which may be named corrIndex in the present document) may be:

$$\frac{R(i+1) - R(i-1)}{R(i+1) + R(i-1)}$$

Hence, at step 124, besides the determination of a peak sample which may give a first information on the TOA, data associated to other samples (e.g., data associated to correlation values of the samples closed, and advantageously adjacent, to the peak sample) may be obtained.

At step 126, a TOA and/or a distance may be calculated on the basis of the peak sample and correction data derived by the at least one additional sample. For example, a coarse estimation of the TOA or distance may be performed from the peak sample in the correlation profile (e.g., the sample with the maximum absolute value). This estimation may be corrected using a correction data derived at least by the correlation data of at least one additional sample preceding and/or following the peak sample. For example, the quotient discussed above (corrIndex) may be used to correct the estimation obtained from the peak sample.

The correlation values close to the maximum of the correlation function (e.g., the values of the correlation profile measured at the samples which are adjacent to the peak sample) may carry additional information on the signal TOF (which may provide information on the distance of the transmitter). By using the values of the correlation function at the samples which are close to the maximum value, the determination of the TOA or distance values may be more accurate (at least, may reach an accuracy level which is similar to an accuracy level that would be achieved with an increased sampling rate). Reference can be made, for example, to the above-discussed quotient (the $i^{th}$ sample being the peak sample):

$$corrIndex = \frac{R(i+1) - R(i-1)}{R(i+1) + R(i-1)}$$

Here, the correlation value R(i−1) at the sample immediately preceding the peak sample i is compared to the correlation value R(i+1) at the sample immediately following the peak sample i. If R(i−1)>R(i+1), it is possible to derive additional information on the position of the transmitter. For example, it is possible to derive the probability of the transmitter being actually closer to the receiver than estimated by simply retrieving the peak sample. R(i−1)>R(i+1) gives the idea that, with a better resolution (higher sampling rate), the peak value would not be retrieved at the time instant associated to the $i^{th}$ sample, but in a sample associated to a preceding time instant. Analogously, if R(i−1)<R(i+1), there is a high probability for the real distance to be greater than estimated when simply retrieving the peak sample. R(i−1)<R(i+1) gives the idea that, with a better resolution (higher sampling rate), the peak value would be identified after the time instant associated to the $i^{th}$ sample.

Therefore, data obtained by the correlation data of at least one additional sample preceding and/or following the peak sample permit to derive correction data for a TOA measurement.

At step 126, the estimated TOA or distance may be corrected using the correction data. For example, a transformation (such as, for example, a linear combination) may be performed to transform the estimated TOA into a corrected measurement through a composition with a value associated to a correction data (e.g., a transformed value).

At step 126, correction data adapted (e.g., calibrated) to the transmission channel may be obtained using pre-assigned configuration data. The pre-assigned configuration data may have been defined, for example, in a configuration session (e.g., using method 110). The pre-assigned configuration data may give information about the environment. The pre-assigned configuration data may permit to increase the accuracy of the TOA measurement, so that the correction data obtained by the correlation data of at least one additional sample preceding and/or following the peak sample are processed to be adapted to the specific environmental conditions of the transmit channel. The pre-assigned configuration data may be in the form of functions (e.g., linear functions) which may transform a first correction data into a second correction data which keeps in account the situation of the place onto which TOA measurements are carried out. The pre-assigned configuration data may comprise a function obtained by inference or interpolation from data signals obtained in a configuration session data (e.g., with method 110). Fitting functions, (e.g., linear fitting function, quadratic fitting functions, or others) may be used.

Each correction data may be associated to a particular TOA value, range, distance range, or TOA range, e.g., after having adapted the data from the correlation function (e.g., peak sample, value on the samples close to the peak sample). As the determination of distances and TOAs as by retrieving the peak value permits to obtain, at best, discrete estimations, each discrete TOA value (or distance) which may be estimated may be pre-assigned (e.g., in a configuration session) to at least one configuration data.

By using correction data based on the data (e.g., value) of the at least one additional sample preceding and/or following the peak sample in combination to the pre-assigned configuration data, the measurement resolution of time delays and distances is increased beyond the maximum resolution bounded to the sampling rate. It is therefore possible to conclude that the present examples reach a subsample resolution (subsample accuracy).

Figure 1B:
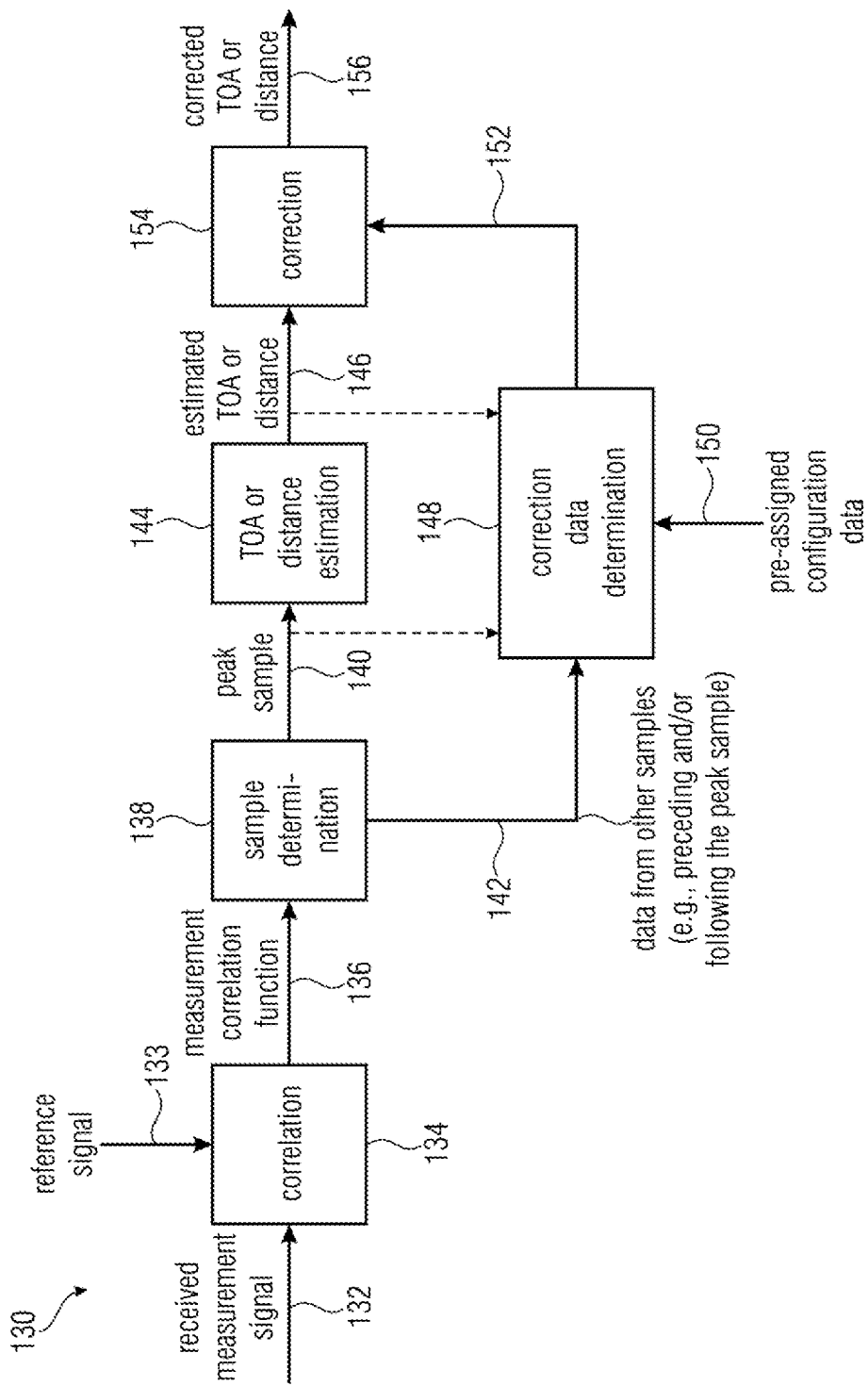
FIG. 1B shows a device according to an example.
Figure 1C:
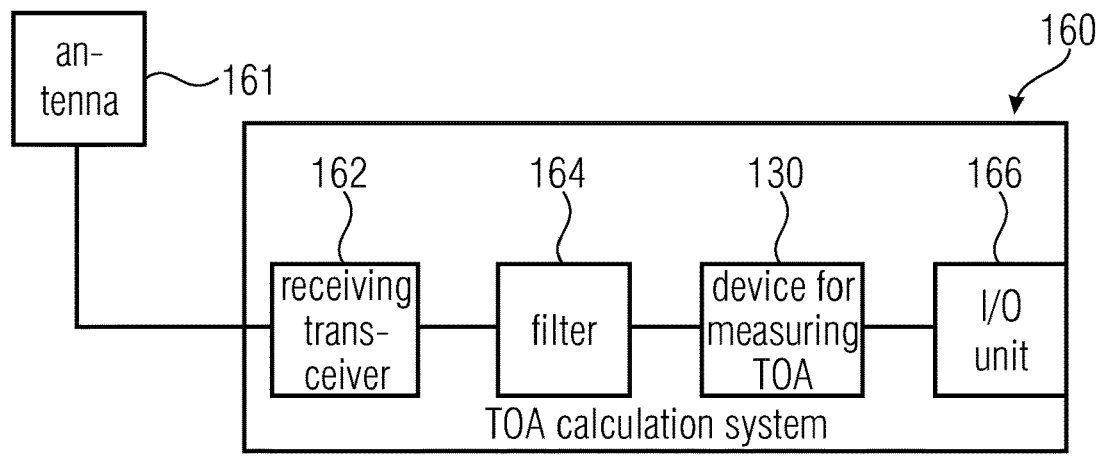
FIG. 1C shows a device according to an example.
Figure 1D:
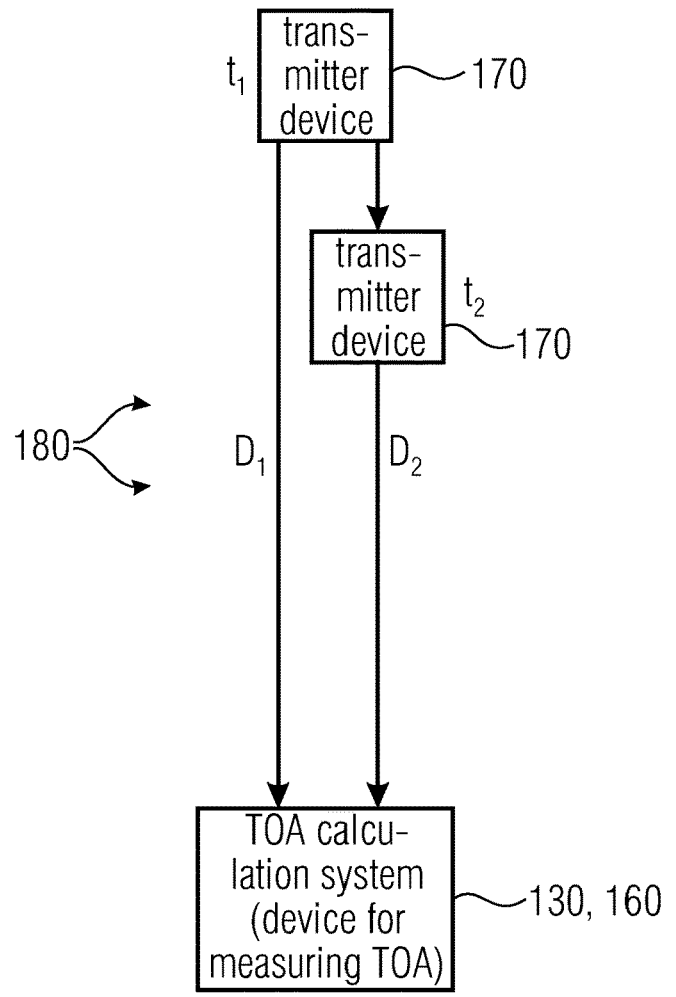
FIG. 1D shows a system according to an example.
Figure 1E:
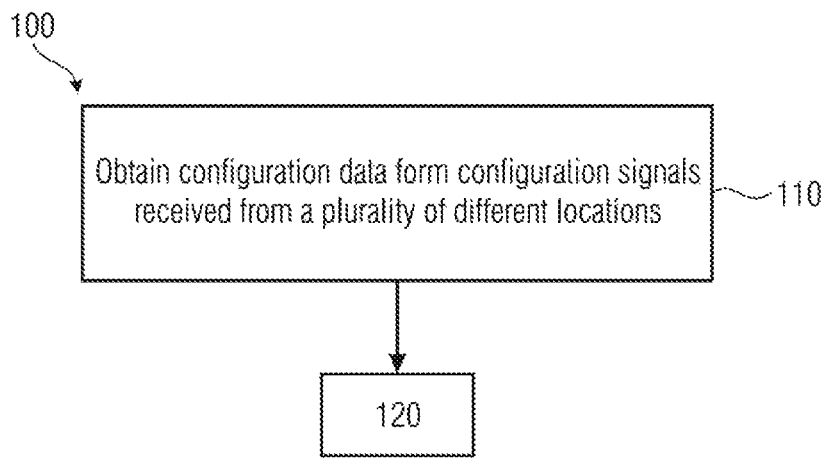
FIG. 1E shows a method according to an example.

FIG. 1E shows a method 110 (which performs a configuration session) which may be used to obtain configuration data (e.g., a plurality of configuration data) from configuration signals received from a plurality of different locations (e.g., from a transmitter which moves through different locations, so that the locations are known, or the distance from the location is known). The configuration data may comprise, for example, data obtained from TOA data achieved by performing correlations on the received configuration signals. The configuration data may provide information on the transmission channel. The configuration data may be used, in the subsequent operation session(s), to better estimate the TOA or distance.

FIG. 1B shows a device 130. The device 130 may be a device for measuring a TOA and/or a distance. The device 130 may perform the method 120, for example. The device 130 may be configured by using the method 110. The device 130 may be part of a receiver device which receives transmissions sent by a transmitter whose distance is to be calculated.

In operation, a received measurement signal 132 (which may be a signal sampled at a particular sampling rate) may be provided to a correlation unit 134. The received measurement signal 132 may be correlated (cross-correlated) with a reference signal 133 (which may be stored in a memory) to obtain a measurement correlation function 136. The measurement correlation function 136 may be provided as an absolute value (e.g., with only positive numeric values), as a normalized value (e.g., by dividing values by a particular value), or similar. By correlating a received function with a pre-stored function, it is possible to determine a maximum in the correlation profile, the sample having the maximum value being related to the TOA of the received measurement signal (and to the distance of the transmitter).

The measurement correlation function 136 may be provided to a sample determination unit 138. The sample determination unit 138 may determine the peak sample 140 of the measurement correlation function 136. The peak sample may be the sample which has the maximum value (e.g., between the absolute values and/or normalized values) of the correlation function. The sample determination unit 138 may also recognize other samples, such as a sample preceding (e.g., immediately preceding) the peak sample 140 and/or a sample following (e.g., immediately following) the peak sample 140. The peak sample 140 may be input to a TOA or distance estimation unit 144, which may estimate a TOA (and/or a distance associated to the TOA) 146. The TOA may be coarsely estimated on the basis of the position of the peak in the correlation function (the position of the peak being associated to a particular TOA, the TOA being associated to a particular distance).

In general terms, the estimation performed by the unit 144 has a limited resolution: in a radio-frequency (RF) signal, for example, the maximum distance resolution of some meters may be achievable, e.g., when the sampling time is in the tens of nanoseconds (approximately, electromagnetic waves travel at the speed of three meters in ten nanoseconds).

A correction data determination unit 148 may be provided. The correction data determination unit 148 may make use of the correlation data (e.g., value) 142 of the sample(s) close to (e.g., immediately before and after) the peak sample 140 in the measurement correlation function 136 and/or the estimated TOA or distance 146. From the data of the close samples it is possible to derive information of the position of a transmitter which is even more accurate than the information inferred by the position of the peak sample.

The correction data determination unit 148 may be input with data associated to the measurement correlation function 136 (e.g., peak sample 140 and/or correlation data 142 associated to the samples close to the peak sample 140, the estimated TOA or distance 146).

The correction data determination unit 148 may be input with pre-assigned configuration data 150 (e.g., obtained with method 110). The configuration data 150 may be stored, for example, in a memory and be at disposal of the correction data determination unit 148. The configuration data 150 may comprise look-up tables and/or functions (e.g., fitting functions). The configuration data 150 may contain information on the environment (transmission channel), as they may have been obtained from actual measurements (e.g., in the configuration session and/or with method 110). The actual measurements may have been obtained at a subsample resolution with respect to the maximum resolution of the measurement (e.g., the resolution associated to the sampling rate). The configuration data 150 may permit to perform transformations so that sample information associated to the peaks 140 and/or correlation data 142 associated to the samples close to the peaks may be transformed into correction data which take into account the conditions of the transmission channel. Therefore, there may be accurate data (e.g., at the subsample accuracy) at disposal of the correction data determination unit 148 for modifying the estimated TOA (or distance) 146.

By using the configuration data 150, the correlation data (e.g., correlation values) 142 of the samples close to (e.g., immediately before and after) the peak sample 140 may be transformed to adapt the estimated TOA (or distance) 146 to high resolution corrected TOA or distance values 156. A correction unit 154 may be used to modify the estimated TOA or distances with the correction data. Notably, not only is the TOA (or distance) 146 corrected, but it also keep into account the conditions of the transmission channel.

For example, in the correction unit 154, there is the possibility of correcting the TOA or distance 146 by composition with (e.g., addition of) a value 152 associated to the correction data, the value 152 being in the subsample resolution.

Figure 10:
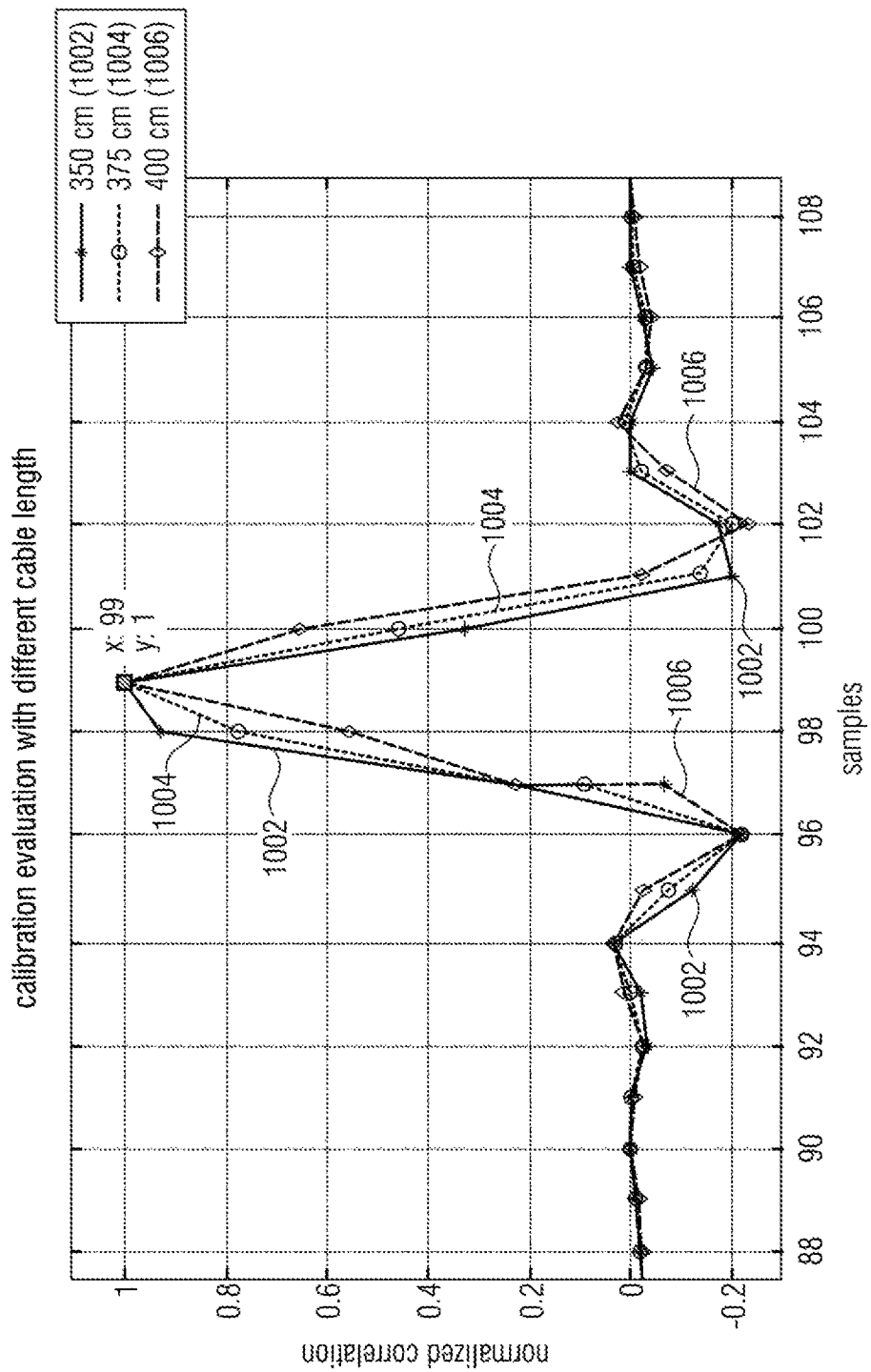
FIG. 10 shows comparative results by implementing different examples.

FIG. 10 shows a device 160 which may be a TOA or distance calculation system 160. The device 160 may comprise an antenna 161. The device 160 may comprise a receiving transceiver 162, which may be connected to the antenna 161. The device 160 may comprise the device 130. The device 160 may comprise a filter 164. The device 160 may also comprise a I/O unit 166, which may provide as an output to a user or to an external device a calculation of the TOA (or a distance), e.g., the value 156.

FIG. 1D shows a transmitter device 170 whose distance $D_1$ at instant $t_1$ is to be determined by the device 130 or 160. The transmitter device 170 may be moved to have a distance $D_2$ from the device 130 or 160 at instant $t_2$. Reference numeral 180 refers to a systems which comprises the transmitter 170 and a receiver 130 or 160 for calculating the distance (e.g., in real time). Transmitter device 170 may be, for example, a Galileo system or satellite.

In general terms, TOA measurements based on retrieving the sample peak in the correlation function are limited in the accuracy by virtue of the maximum sampling time (which has a finite value). If, in an RF environment, the sampling time is 10 ns, the maximum accuracy of a TOA measurement based only on retrieving the peak sample may have a resolution of approximately 3 m. Therefore, by sampling at 10 ns, only distances which are approximately multiple of 3 m would be detectable without approximation.

In some examples, FIG. 1 may concern a simulated receiver, a simulated transmitter, and a simulated channel.

Figure 2A:
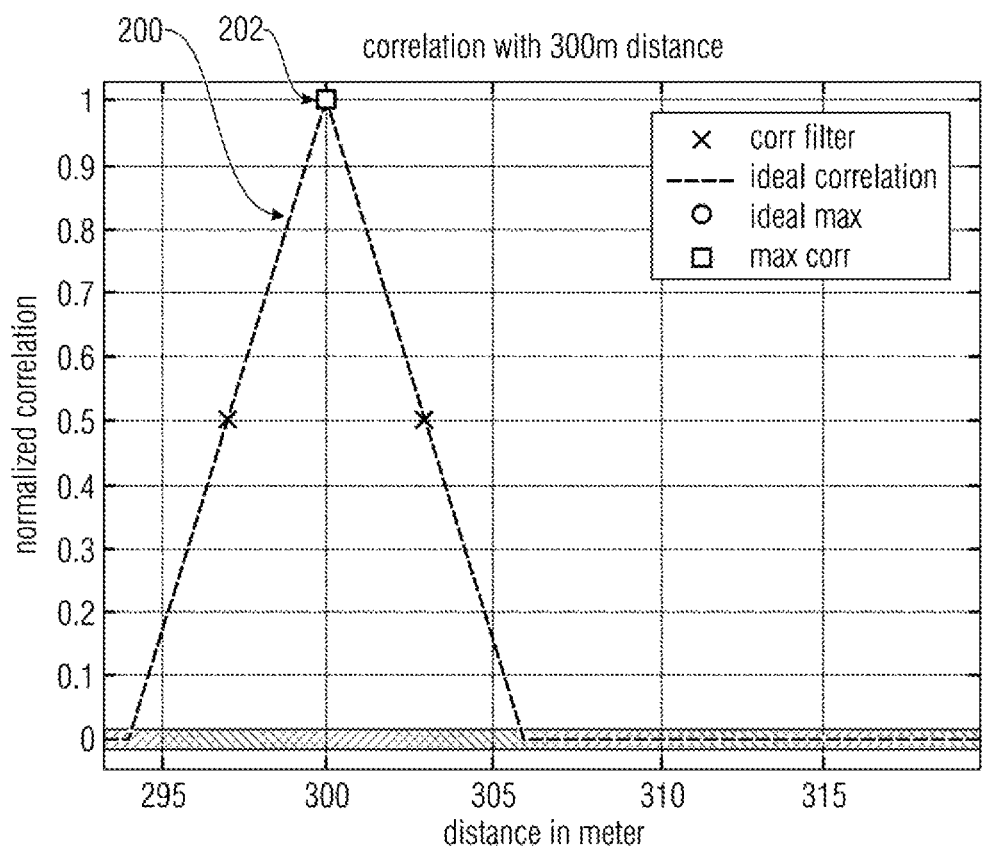
FIGS. 2A, 2B, and 2C show comparative results by implementing different examples.
Figure 2B:
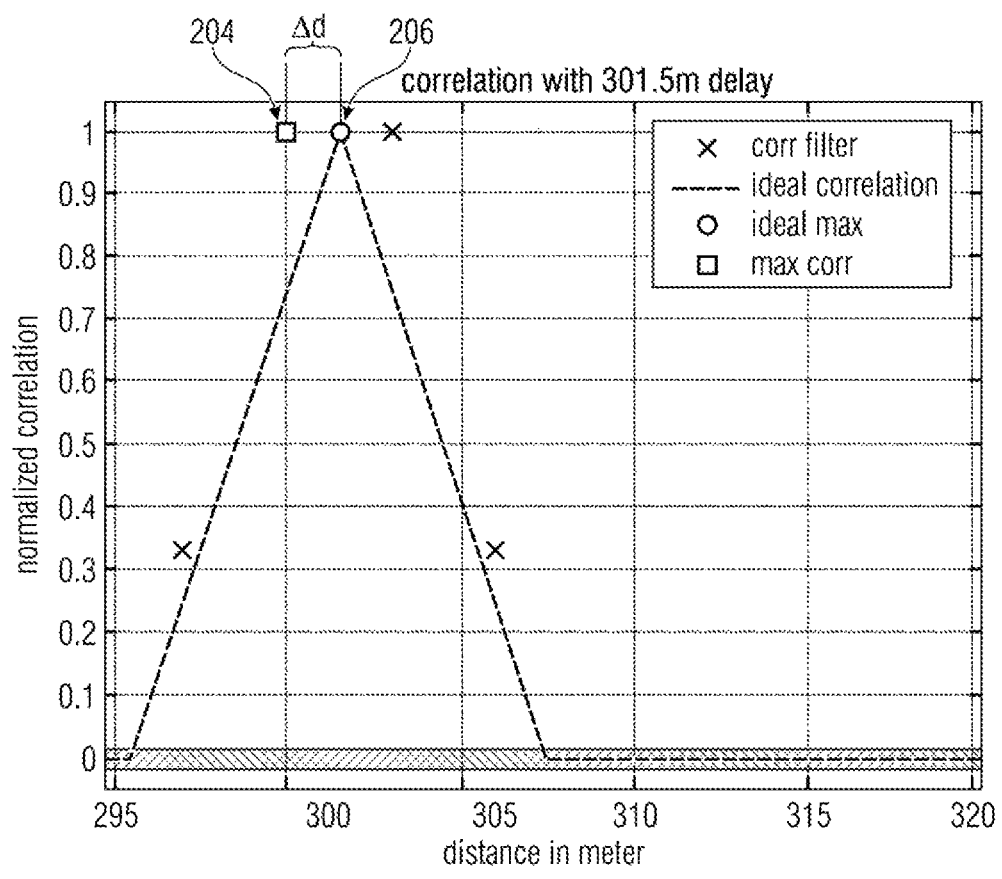

A comparative example is provided by FIGS. 2A and 2B. In FIG. 2A, an ideal profile 200 for a correlation on a signal received from a distance of 300 m is aligned with the reference signal (0°) and provides a correct peak. However, with 180° phase difference as shown in FIG. 2B (which refer to an estimation without correction, e.g., by simply retrieving the maximum in the correlation profile), a detected maximum 206 deviates from the ideal maximum 204 with a Δd which is 1.5 m in this case. In FIGS. 2A and 2B, the abscissa is provided in meters (as a consequence of the distance being associated to the peak position in the correlation sample). A correlation filter that computes the correlation may be used.

In systems which do not have correction data, only when a transmitter (e.g., 170) transmits a signal from a position at a distance which is a multiple of the distance travelled by the waves, the TOA measurement may be, at best, correct. When the transmitter transmits from a different position, a certain amount of error may be present.

Figure 2C:
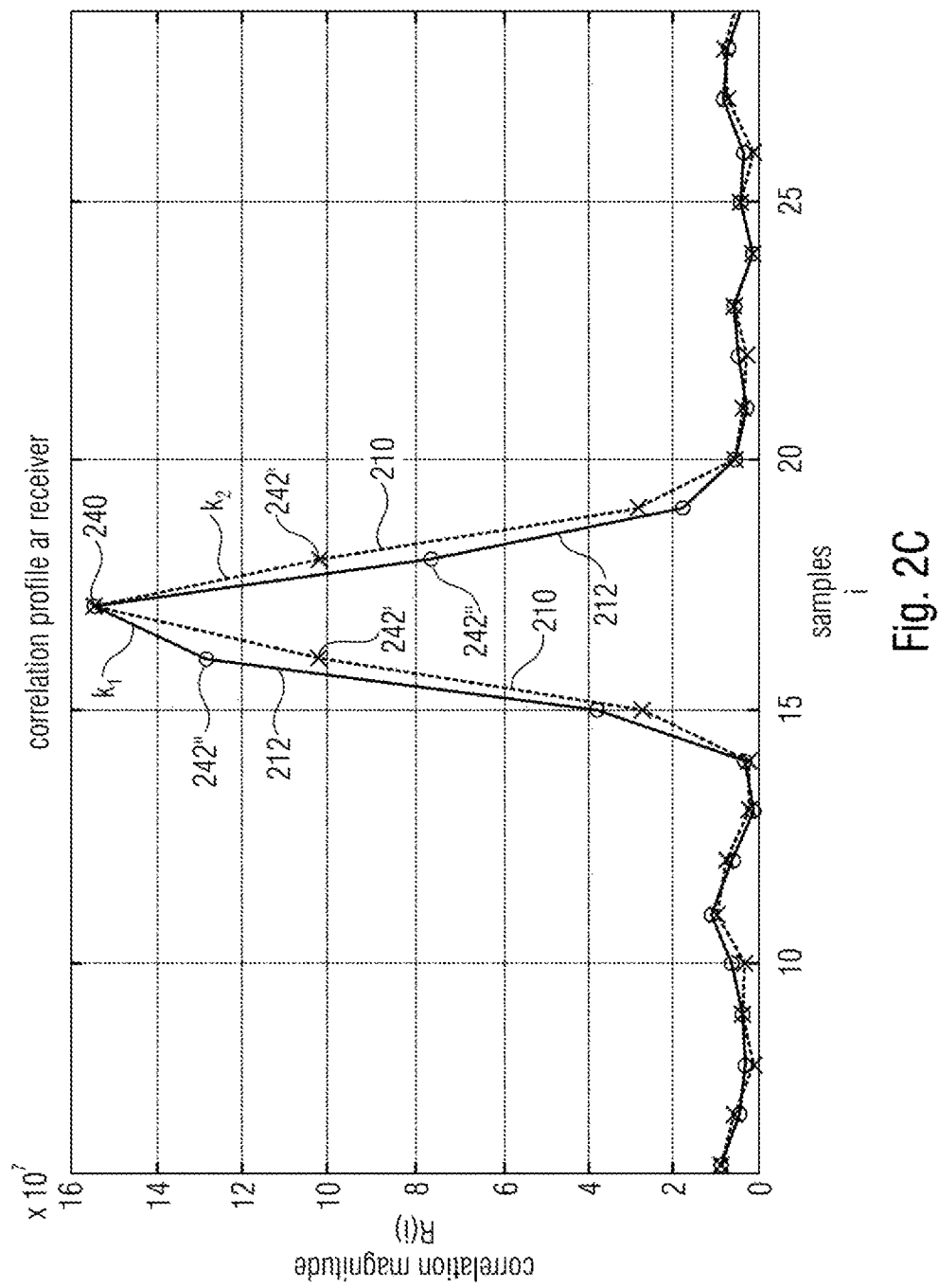

Notwithstanding, it is possible to correct the deviation of the TOA measurements, e.g., by implementing the method 120 and/or using the device 130 or 160. FIG. 2C shows a first correlation profile (function) 210 (which may represent a measurement correlation function 136) of a first received signal received in a measurement session from a distance which is exactly detectable by retrieving the peak sample when correlating a received function (i.e., the transmitter is placed at a distance which is multiple to approximately 3 m for a 10 ns sample time). A peak 240 may be identified (e.g., by the sample determination unit 138 or step 124). Accordingly, the peak sample may be identified (in FIG. 2C the peak sample is in the $17^{th}$ sample), and the TOA and/or distance may be coarsely estimated (e.g., by unit 144). Two other samples, associated to the correlation values 242', may be identified as the samples immediately before and after the sample with the peak 240.

FIG. 2C also shows a second correlation profile (function) 212 of a second received signal received in the same measurement session, but after that the transmitter has moved of half meter (e.g., the distance is now approximately 2.5 m). By performing the second correlation (e.g., by repeating step 122 for a new signal), a second peak in may be retrieved. In this case, the peak of the second correlation profile 212 is at the position of the peak of the first correlation 210. This is due to the fact that the first and second received signals are received from distances which are too close to each other to be distinguished at the resolution of the present sampling rate. However, the positions of the samples immediately before and after the peak sample in the second correlation profile 212 are different from the samples 242' of the first correlation profile 210. Therefore, even if, from the position of the peaks 240 the distance of the transmitter would not be measured with a great precision, it is notwithstanding possible to use samples close to the peak sample (e.g., samples 242") to reconstruct a more exact location of the transmitter at a subsample resolution. Using the correction data 152 obtained by the data carried by the samples 242" (e.g., values 142), it is possible to correct the results of the estimation.

However, it has been noted that even using the values of the samples preceding and following the peak sample, it is still possible to increase accuracy, e.g., by using the pre-assigned configuration data 150. As the pre-assigned configuration data have been collected from a plurality of TOAs and/or distances which have distances smaller than the measurement resolution associated to the sampling rate, the pre-assigned configuration data are suitable for adapting to the transmission channel (e.g., calibrating) the correlation data associated to the samples preceding and/or following the peak sample.

For samples 242", the correlation value R(i−1) (which is the $16^{th}$ sample) is higher than the correlation value R(i+1) (which is the $18^{th}$ sample). It is therefore possible to infer that, with an increased resolution (e.g., with a much better higher sampling rate), the "real peak" would be retrieved before the instant associated to the peak sample. Therefore, the above-identified quotient corrIndex $$\frac{R(i+1) - R(i-1)}{R(i+1) + R(i-1)}$$

may provide a more accurate information on the position of the transmitter with respect to the estimation based on simply retrieving the peak value in the correlation function.

However, by adapting data obtained from the samples close to the peak sample (e.g., from the quotient corrIndex) using pre-assigned data at a higher resolution (subsampling resolution), it is possible to further increase the accuracy of the corrected TOA and/or distances 156.

The correction data to be used for measuring the distance (or TOA) may be obtained by adapting the data obtained by the samples preceding and/or following the peak sample with data associated to the transmission channel, these data having being obtained at a subsampling resolution (the subsampling resolution being higher than the sampling resolution of the measurements performed by the sample determination unit 138, for example). An example of pre-assigned configuration data 150 (which may be obtained with method 110) is provided in FIG. 6A. The pre-assigned configuration data 150 (e.g., correction index) may take the form of a linear function 600. The linear function 600 may have been obtained, for example, by inference, interpolation, least square method, or other statistical methods. The linear function 600 may be used to transform data from a measurement correlation function (e.g., data associated to the peak preceding and/or following the peak sample) into data which keep into account the features of the environment (transmission channel). Different environments, therefore, may be associated to different linear functions (e.g., different slopes).

Figure 6A:
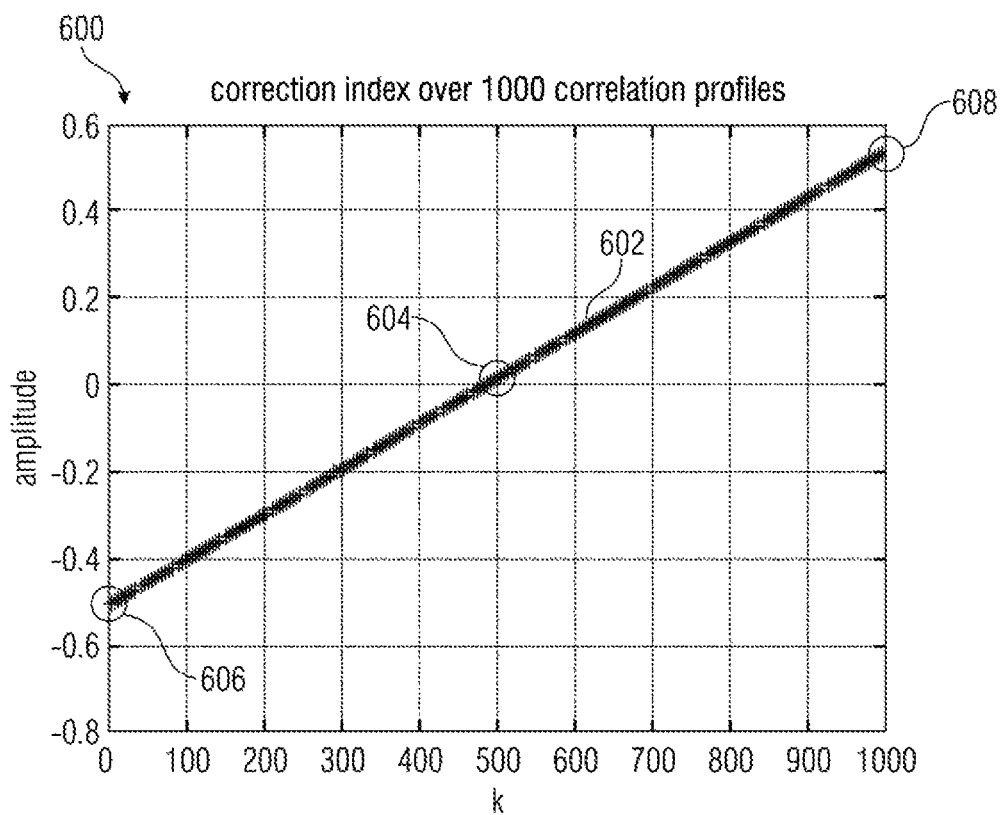
FIGS. 6A and 6B show functions according to examples.
Figure 6B:
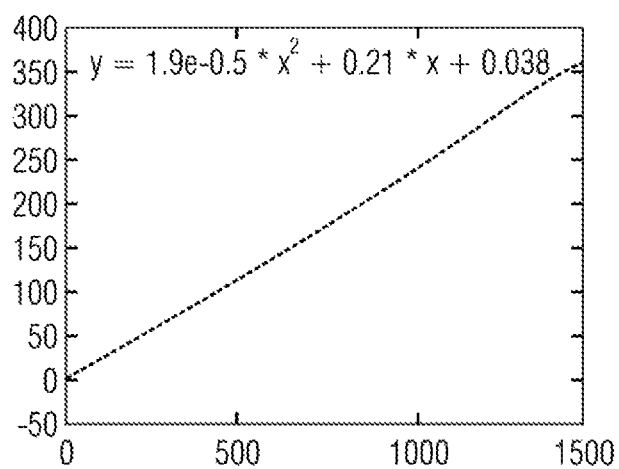

In FIG. 6B, a quadratic function is shown. The quadratic function may be expressed, for example as $y=ax^2+bx+c$. In one case, for example, it may be:

$$y=1.9e-05*x^2+0.21*x+0.038$$

Figure 3:
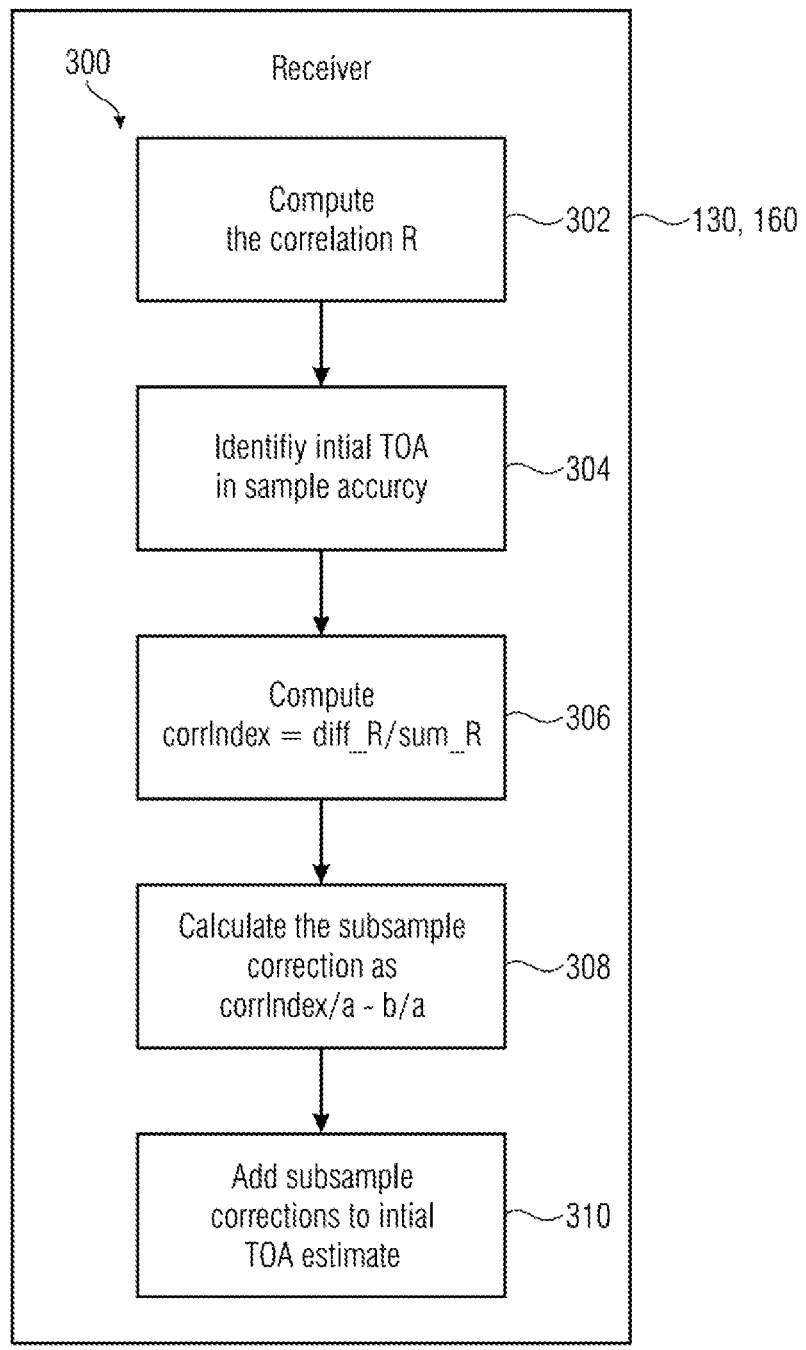
FIG. 3 shows a device according to an example implementing a method according to an example.

FIG. 3 shows a method 300 which may be performed as an embodiment of method 120 and/or by the device 130 or 160.

At step 302 (which may embody step 122), a correlation R is computed, e.g., by obtaining the measurement correlation function 136. The correlation R may have a sample resolution (which may be, for example a resolution associated to the sampling rate of the received signal and/or the sampling rate of the correlation function).

At step 304, an initial coarse TOA (e.g., TOA 146) or a coarse distance may be identified (e.g., through units 138 and 144).

At step 306, calculations associated to the correlation function 136 (e.g., to the correlation data of at least one additional sample preceding and/or following the peak sample 242") are performed (e.g., at the correction data determination unit 148). For example, it is possible to calculate values such as:

$$\text{diff\_R} = R(i+1) - R(i-1)$$

$$\text{sum\_R} = R(i+1) + R(i-1)$$

$$\text{corrIndex} = \frac{\text{diff\_R}}{\text{sum\_R}}$$

Hence, the value corrIndex may embody the quotient discussed above and may give an idea of the "real position" of the peak. Notably, if the real distance (or TOA) is greater than the distance estimated by retrieving the peak sample in the correlation profile, then the value diff_R=R(i+1)−R(i−1) is greater than zero.

At step 308 (which may be performed by the correction data determination unit 148 and/or in step 126), the correction data 152 may be calculated, e.g., by adapting the corrIndex to the environment conditions. For example, the correction may be performed using a linear transformation which may translate corrIndex by a pre-assigned configuration data "b" and scale by a pre-assigned configuration data "a" according a formula such as:

$$\text{correction data} = \left(\frac{\text{corrIndex}}{a} - \frac{b}{a}\right)$$

The term "b" may be related to the number of correlations, for example. This term "b" may be used to adjust, in some cases, for slight deviations when linear fitting is performed (e.g., when a linear equation may approximately fit corrIndex but error margin is acceptable). It is also possible to choose a higher degree fitting function (e.g., a quadratic fitting function).

The quotient corrIndex, calculated on the basis of the correlation values of the samples close to the peak sample, may therefore be scaled by a quantity "a". Basically, "a" and "b" may be the coefficients of a linear transformation which keeps in account the conditions of the transmission channel. Other ways of adapting the correction data to the particular transmission channel may be defined (e.g., using a quadratic transformation, and so on).

Data such as, "a" and "b", which are pre-assigned, may have been obtained in a configuration method (e.g., method 110). Basically, data "a" and "b" provide a modeled profile which permit to correct the imprecise TOA estimated by simply searching for the peak sample in the correlation profile.

At step 310 (which may be embodied by correction unit 154 and/or performed in step 126), the correction data may be composed (e.g., algebraically summed) to the initial TOA or distance estimated at step 304 (e.g., by unit 144).

Therefore, the final TOA may be a linear combination between an estimated TOA and a correction value, for example:

$$\text{Final\_TOA} = \text{estimated\_TOA} + (\text{Correction} - K/2)/K$$

K may be a fixed number. K may be associated to the number of subsamples of the configuration session, for example (i.e., the number of configuration signals, received by different distances in the configuration, for which the correlations have been performed).

The pre-assigned configuration data 150 may be the same for all the TOAs (or distances). As can be seen from FIG. 6A, for example, the data a, b may be constant, as they are coefficients of a linear function. Also the parameter K (number of subsamples) may in general be fixed.

Examples of a configuration session are here discussed. In some examples, it is possible to use a transmitter such as the transmitter device 170, which, as shown in FIG. 1D, may move between different positions in different time instants. For example, the transmitter may move from a distance $D_1$ to a distance $D_2$ between time instants $t_1$ and $t_2$. The transmitter and/or the receiver may have units (e.g., GPS unit, clock unit, storage device, calculation unit etc.) which permit to keep into account data associated to the position (e.g., coordinate data, geographical data, and so on) or the receiver is capable of taking the relative distances into account without the need for a synchronization scheme. The transmitter and/or the receiver may be engaged to a moving device, which may transport it along different positions (e.g., geographical locations). The transmitter and/or the receiver may be engaged to a satellite, for example.

Figure 4:
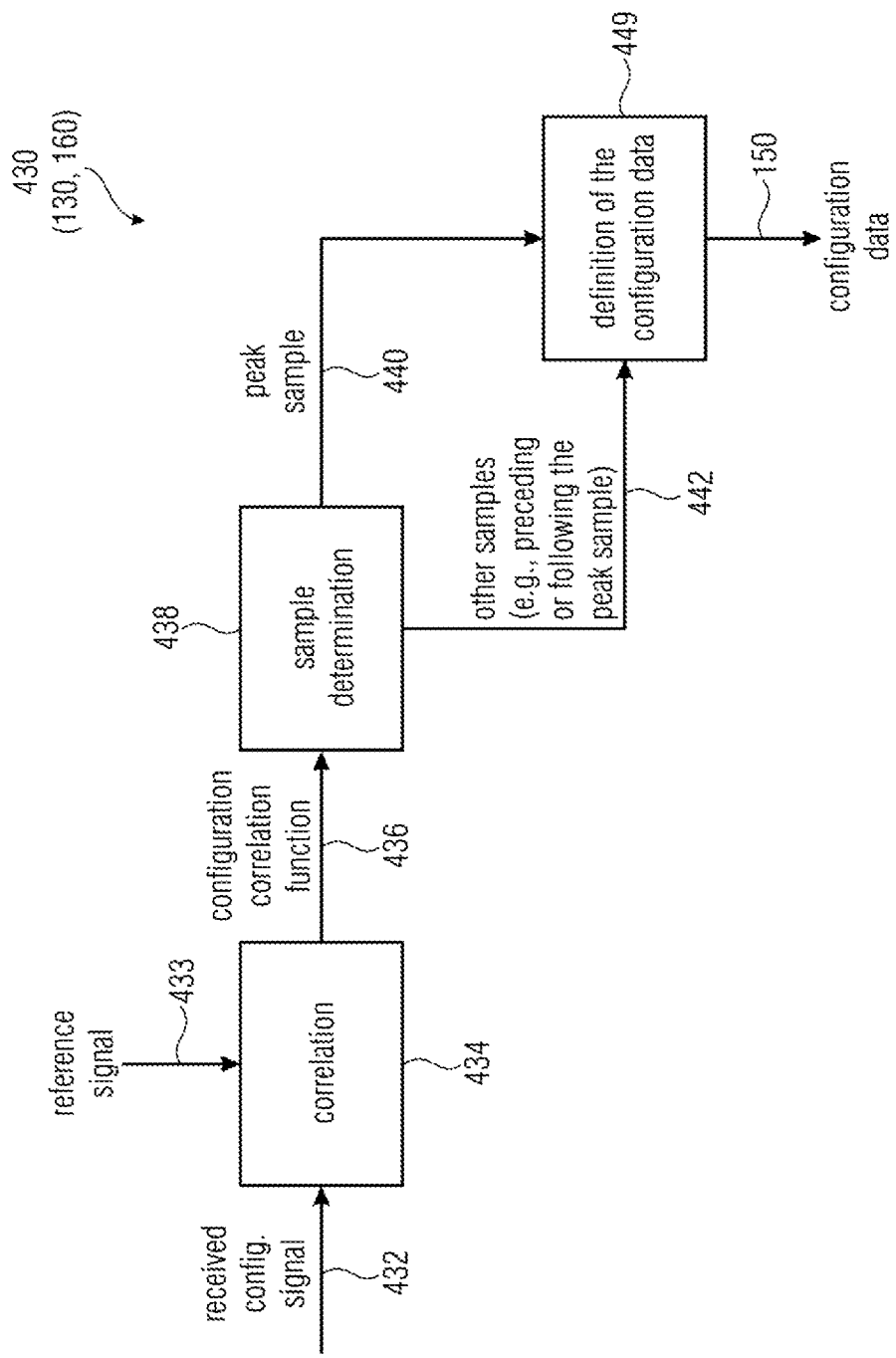
FIG. 4 shows a system according to an example.

FIG. 4 shows a receiver 430 which may be, for example, the device 130 and/or 160. The receiver 430 may define the configuration data 150. FIG. 4 shows the scheme of the device 430, with units which may be the same of the units of FIG. 1B (the same units may be retrieved by substituting "4" with "1" in the first digit of the reference numerals). A received measurement signal 432 may be input to a correlation unit 434. The received measurement signal 432 may be correlated with a reference signal 433 (which may be stored in a memory) to obtain a configuration correlation function 436. The measurement correlation function 436 may be provided to a sample determination unit 438. The sample determination unit 438 may determine the peak sample 440 of the measurement correlation function 436. The sample determination unit 438 may also determine data (e.g., correlation values) from other samples, such as a sample preceding (e.g., immediately preceding) the peak sample 440 and/or a sample following (e.g., immediately following) the peak sample 440. The peak sample 440 and the other samples may be provided to a configuration data definition unit 449 to provide (and/or save in a memory) configuration data which, in operation, will provide the pre-assigned configuration data 150. An example of the configuration data 150 defined by the configuration data definition unit 449 may be, for example the coefficients "a" and "b" discussed above.

During the configuration session (e.g., method 110), the distance separating the transmitter (e.g., 170) and the receiver may be changed (the receiver and/or the transmitter may change the position). Therefore, the receiver 430 may receive a configuration signal from each of a plurality of distances. The configuration signal may be a continuous or burst electromagnetic or ultrasound transmission, which may notwithstanding be taken at different distances separating the transmitter and receiver during different time instants. Therefore, the receiver 430 may obtain data from a plurality of received configuration signals, each of which may be processed (e.g., using different correlations). In some examples, it is possible to use a single correlator, where measurements are carried at different time instants. The receiver 430 may correlate each of the received configuration signals, and for each of them determine the peak sample 442 and correlation data (such as correlation values) associated to the at least one additional sample 442 preceding and/or following the peak sample 442. At least some of these operations may be performed not in real time (e.g., after having received and stored all the signals received by the transmitter), such as offline.

In the configuration session, the transmitter or receiver may spatially move while sending a configuration transmission, so that the receiver receives in different time instants signals at different distances.

In some examples, the configuration session may be performed on a simulation level. The distance displacement at the simulation may be performed for example with a simulated channel and software transceiver modules.

When performing real configuration measurements in the configuration session, a hardware chain for the transceiver may be used. Reference may be made to FIG. 1D, where a cable is not shown but may be provided between the devices 170 and 130/160. Cables of different length may be used for this configuration session to get a correlation profile at each length. FIG. 10 shows measurements performed for different cable lengths (1002: 350 cm; 1004: 375 cm; 1006: 400 cm). The cable may directly connect the transmitter to the receiver output. The exact signal propagation time for each cable may be controlled with a measurement instrument set at the defined carrier frequency (for example a network analyser). The transmitter (e.g., 170 in FIG. 1D) and receiver (e.g., 130, 160, 430) should be synchronized in this step otherwise it will not be possible to measure the relative propagation time at different instants due to the frequency offsets. The number of cables used may be related to the number of subsamples (K). Following the steps in 120 the value of corrIndex may be calculated for each measurement with a different cable length. Knowing the exact signal propagation time for each cable, the profile in FIG. 6A may be then obtained with real data. The number of corrIndex(k) values is equal to the number of measurements taken within one sample (i.e. the relative propagation time from the cable length is in subsamples).

With respect to the measurement session (e.g., method 120), the configuration session may have a resolution which is greater (subsample resolution). If, for example, the sampling rate to be used at the measurement session is 10 ns (associated to a maximum resolution of approximately 3 m), the configuration session may be so that the receiver collects configuration signals when the transmitter has travelled a distance less than 3 m (e.g., every 300 mm, to obtain a configuration resolution 10 times greater than that achievable with the simple detection of the peak value in the correlation). Hence, in the configuration session, the received configuration signals are received from a succession of distances which with a resolution better than the resolution of a TOA measurement when only based on retrieving the peak sample. Therefore, it is possible to obtain information at subsample resolution which may be used to adapt, in the measurement sessions, the data obtained from the correlation values of the samples close to the peak sample to the environment.

Reference may be made to FIG. 2C. The receiver 430 may receive two different signals which provide different correlation profiles 210 and 212 which may have been transmitted by the transmitter from different positions (e.g., from distances of half meter). The distance between the different positions (e.g., the half meter) is within the maximum resolution (notably, the correlation profiles 210 and 212 have the same maximum 240). However, it is possible to obtain information from correlation data (e.g., 442) of at least one additional sample preceding and/or following the peak sample (e.g., data R(i−1) and R(i+1)). These data may permit to calculate the configuration data 150 (e.g., the coefficients "a" and "b") which will be used in the measurement session.

Other than in the measurement session, in the configuration session the position of the transmitter is in general known for each signal that is received by the receiver: the transmitter may have the knowledge of the position, e.g., an absolute position and may store or transmit data relating to the position, so as to permit to associate a particular configuration signal, as received by the receiver, to the transmitter's position. Even if the absolute position is not known, the relative distance between different measurements may be sufficient. For this step a number of measurements related to subsamples may be taken. Even if the absolute TOA is not known, the configuration data can be extracted from the correlation profiles taken at several instants within one sample. Hence, in the configuration session, it is possible associate the distance of the receiver from the transmitter with values (e.g., 242″) of the correlation data (e.g., R(i−1) and/or R(i+1)) of at least one additional sample (e.g, i−1 and/or i+1) preceding and/or following the peak sample. It is possible to determine, as a feedback, the behaviour of the transmission channel on the basis of the transmitted data. The configuration may therefore provide pre-assigned configuration data (calibration data) which will be used, in the operation session, to adapt the correction data to the environment.

If the configuration signals 432 are received from distances which are less than the maximum resolution which is normally achievable with a simple determination of the peak sample, the collected configuration data 150 may be considered to be at a subsampling rate, as they have a precision which goes beyond the resolution provided by the sampling rate.

Figure 1F:
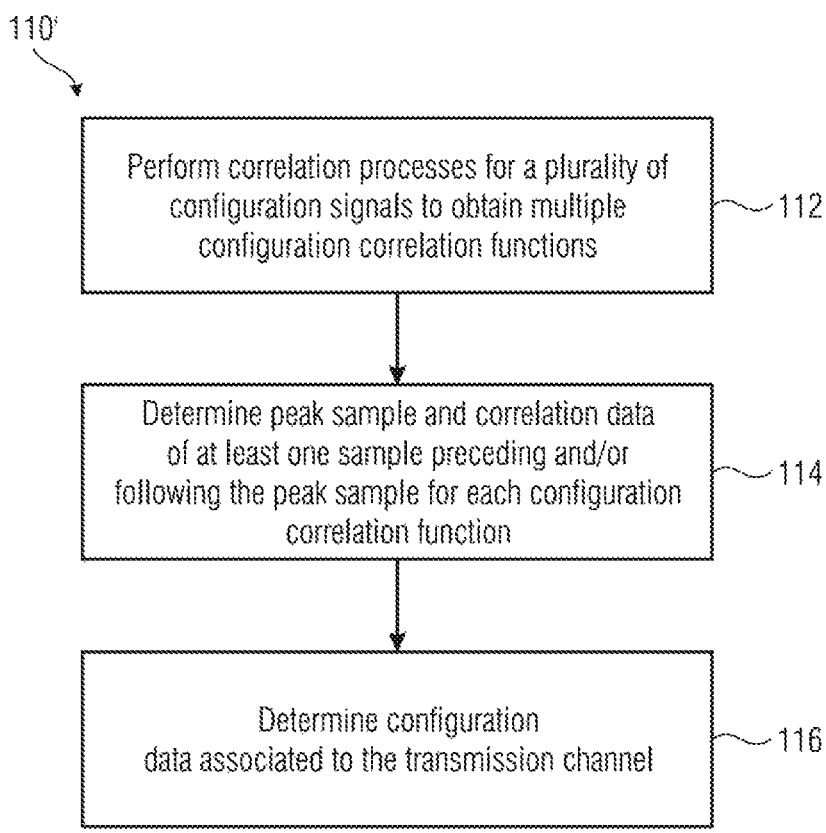
FIG. 1F shows a method according to an example.

FIG. 1F shows a method 110′ for performing a configuration session (e.g., to implement method 110 and/or performed by the device 430).

At step 112, a plurality of correlation processes for a plurality of configuration signals may be performed to obtain multiple configuration correlation functions at different distances (e.g., associated to different subsamples). The distance between the signals is at a subsample resolution with respect to the sample resolution of the measurement method 120, for example (e.g., the time distance between two consecutive samples of the measurement received signal 132 is associated to a distance which is greater than the distances for which the correlations are calculated in the configuration session). The configuration signals from which the calculations are made may be either obtained through actual measurements or simulated.

At step 114, for each configuration correlation process performed at step 112, the peak sample and data of at least one sample preceding and/or following the peak sample for each configuration may be determined.

At step 116, configuration data (e.g., data 150) are associated to the transmission channel. The configuration data have a subsample resolution and, therefore, may be used to obtain the correction data for correcting the estimated TOA and/or distance.

Figure 5A:
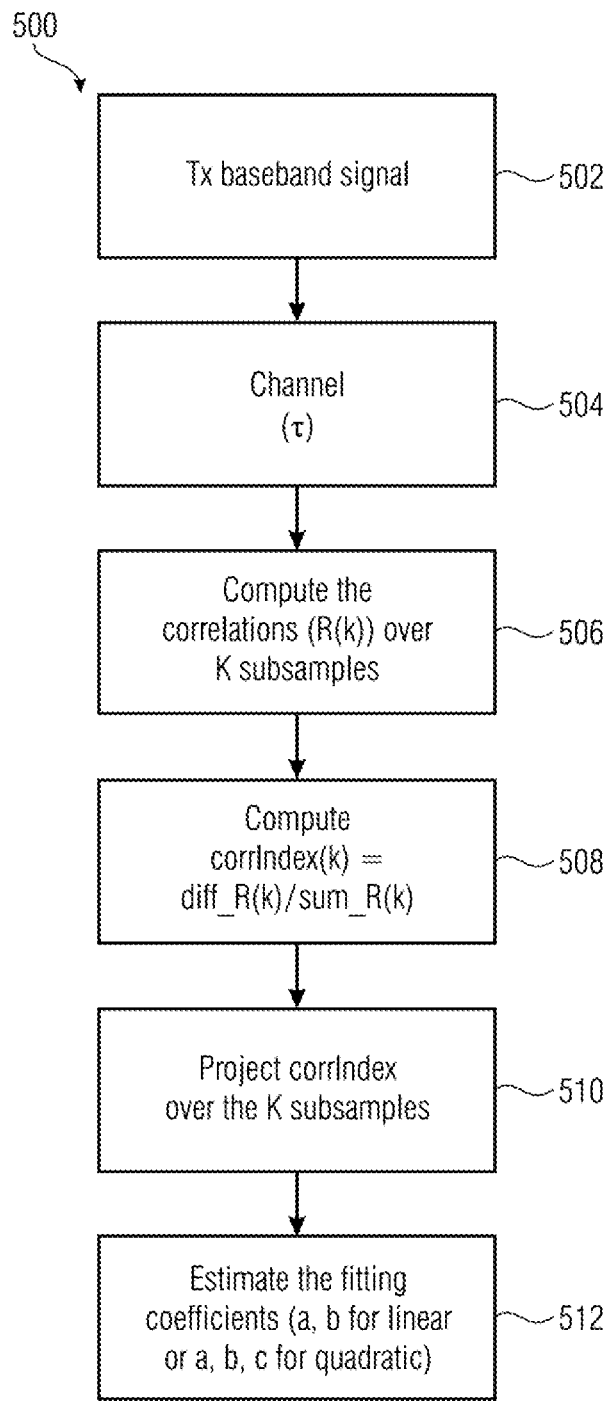
FIG. 5A shows a method according to an example.

An example of configuration session is provided by the method 500 in FIG. 5A, which may embody a step 110, for example, and which may embodied, for example, the operations of the device 430, for receiving transmissions performed, for example, by the transmitter 170.

Figure 5B:
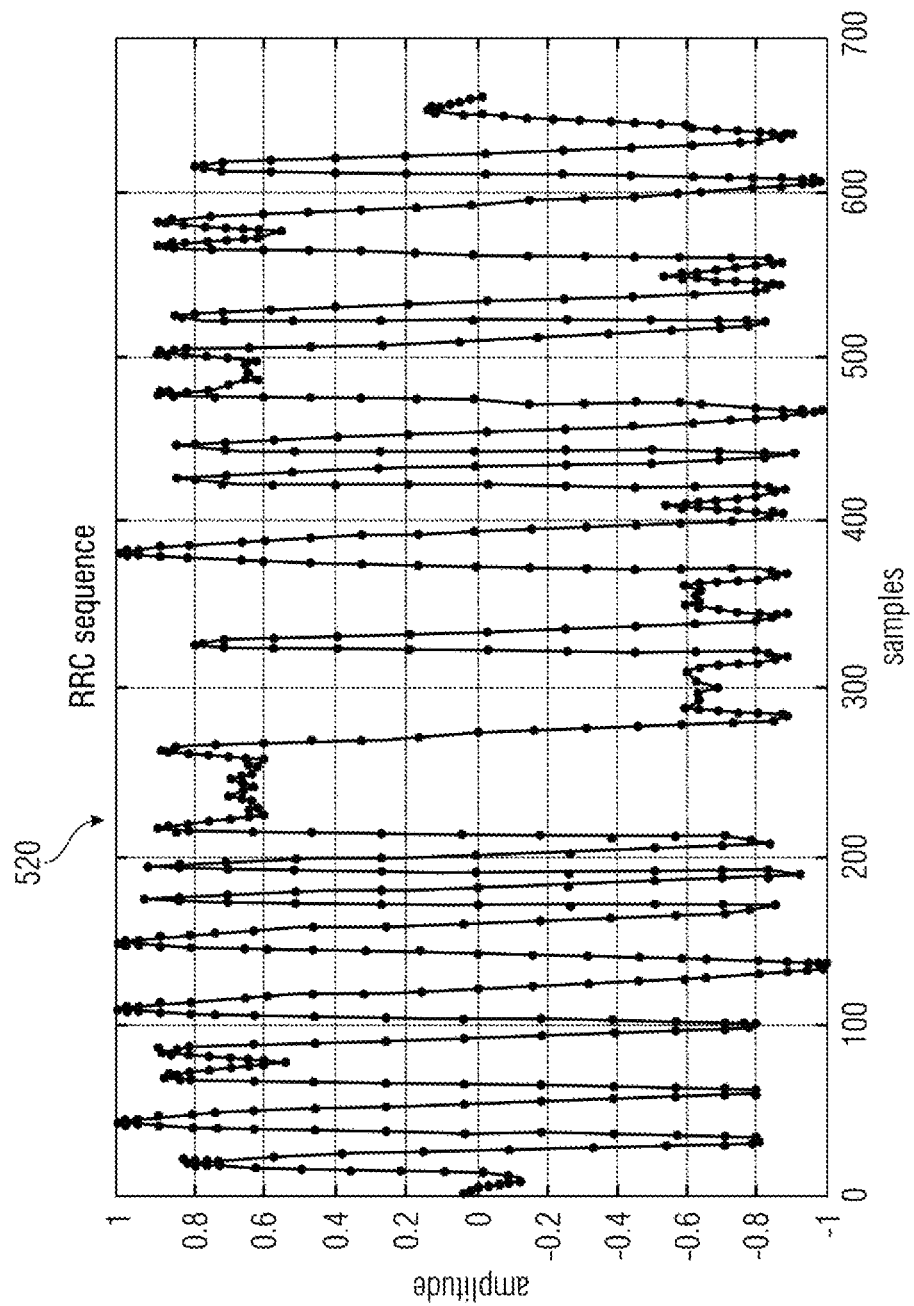
FIG. 5B shows a result of an implementation according to an example.

At step 502, a transmission is started by the transmitter (the transmission will continue in the subsequent steps). According to examples, the transmission may be at baseband. A sequence code 520 of 64 length shaped with an RRC filter with 5 between 15 (e.g., 10) samples per symbol at the transmitter is shown in FIG. 5B. However, other pulse shaped filters may be used.

At step 504, the transmission is actually performed on the transmission channel. The transmission is received as a single signal 432 in FIG. 4 (it may be sampled, filtered and so on).

At step 506, correlations R( ) are performed, e.g., using the correlation unit 434. Each received signal may be understood as relating to a subsample "k". The reference to subsamples is justified in that information is provided on data which would not be achievable by simply estimating a distance or a TOA retrieving the peak sample. Further, using the sample determination unit 438, the peak sample and correlation data of at least one additional sample preceding and/or following the peak sample is acquired.

At step 508 (which may be performed, for example, by the configuration data definition unit 449), configuration data may be obtained for a subsample "k". For example, if the peak sample in the $k^{th}$ correlation profile is sample "i", the following calculations may be performed:

$$\text{diff\_R}(k) = R(i+1, k) - R(i-1, k)$$

$$\text{sum\_R}(k) = R(i+1, k) + R(i-1, k)$$

$$\text{corrIndex}(k) = \frac{\text{diff\_R}(k)}{\text{sum\_R}(k)}$$

Notably, in this case, a corrIndex(k) value may be calculated for each subsample "k".

At step 510, a projection of corrIndex(k) may be made over a finite number (e.g., K) of subsamples (e.g., of received configuration signals 432). The number of subsamples may be, for example, the number of received configuration signals that are received by the receiver in the configuration session.

Projection of different corrIndex(k) for k=0 . . . K may reflect the fact that, while the k values "corrIndex(k)" are samples (e.g., they are obtained as a succession of values), it is possible to obtain a continuous function which approximates the different data obtained by the different configuration signals.

At step 512, a regression technique (e.g., linear regression) may be used to obtain a continuous function. A linear fitting function (or a quadratic fitting function) may be calculated from the multiple sample data. for example, coefficients a, b for a linear fitting function and/or coefficients a, b, c, for a quadratic function may be calculated.

FIG. 6A shows a graph 600 (abscissa: subsamples k; ordinate: amplitude) in which multiple points (each point associated to data obtained from a correlation to a configuration signal received by the receiver during a configuration session) have been used to approximate a linear function (e.g., using a linear fitting, linear regression) by a single line 602. A least square method may be used to calculate the line 602. The linear function may be described as:

Amplitude=$ak+b$

The coefficients a and b may be the values a and b to be used in step 308 to embody the pre-assigned configuration data 150. As it can be understood, the pre-assigned configuration data 150 may be easily obtained in the configuration session in the subsample resolution.

The configuration data 150 may be defined for each discrete value (TOA or distance) or for each possible peak sample which will be identifiable by performing correlations.

Accordingly, during the measurement session (operation session) it is possible to calculate a TOA from the estimated TOA and the function estimated by the corrIndex on the basis of the data obtained by the at least one sample close to the peak sample. The following three cases may be taken in account:

For example, in the measurement method 300, after having identified the TOA at 304, the having computed the corrIndex at 306, having calculated the subsample correction as corrIndex/a-b/a with the pre-assigned configuration values a and b (obtained in the configuration session), it is possible to calculate the final TOA as a linear combination of the estimated TOA and a correction value. For example:

TOA_fine=TOA_coarse+(Correction-$K/2$)/$K$.

Correction may be, for example, obtained as:

Correction=corrIndex/$a-b/a$

Figure 7:
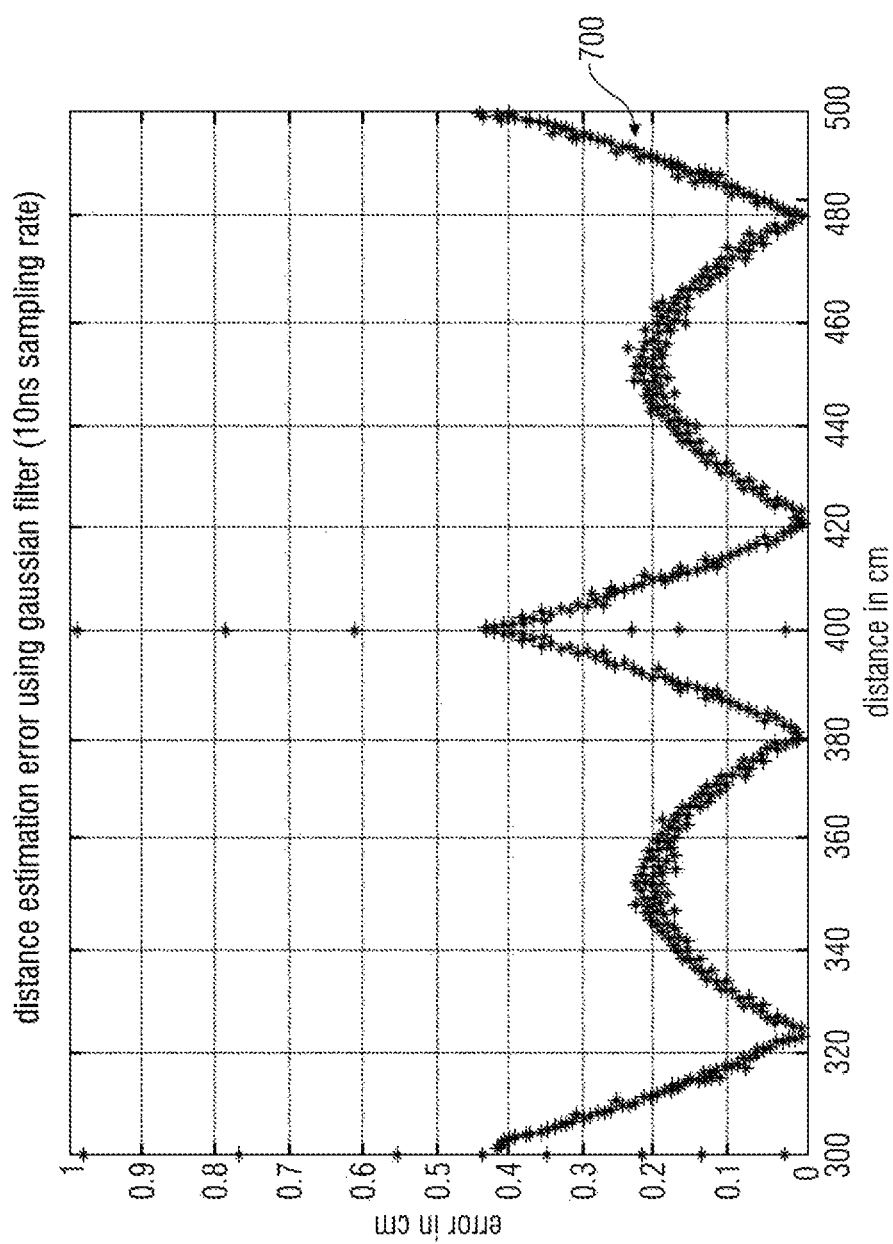
FIG. 7 shows results according to an example.

FIG. 7 has a graph 700 showing in ordinate errors 700 in calculating the TOA after having applied the fitting method with a sampling time of 10 ns (abscissa: distance transmitter-receiver). It is possible to see that the error may be less than 1 cm, where in FIG. 2B the error could have been 1.5 m. The error increase in the middle occurs when R(i−1) and R(i+1) are close to each other.

Figure 8A:
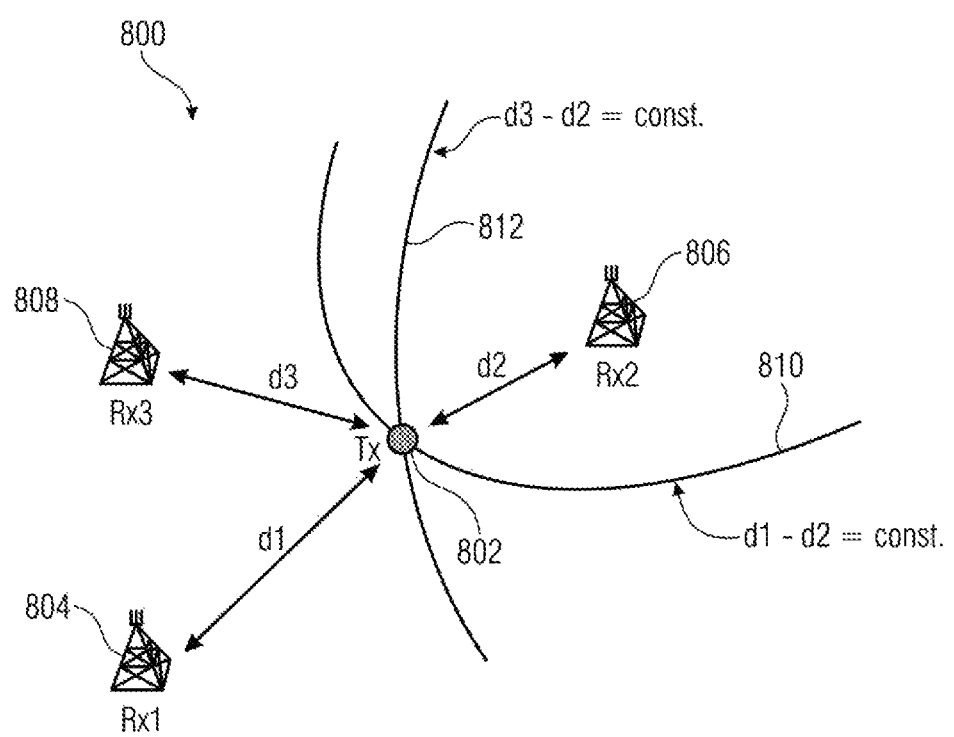
FIG. 8A shows a system according to an example.

FIG. 8A shows a time difference of arrival, TDOA, localization system 800 comprising a transmitter 802 (which may be, for example, a mobile phone, a mobile terminal, a smartphone, a localization device, or a similar apparatus) which has to be localized (e.g., its distance has to be determined) and at least three synchronized receivers Rx1 804, Rx2 806, and Rx3 808 (which may be base stations, e.g., of a mobile communication network, such as a GSM network or similar, or devices at known positions). The transmitter 802 may be, for example, the transmitter 170; at least one of the receivers Rx1 804, Rx2 806, and Rx3 808 may be one of the device 130, 160, 430. The distances d1, d2, d3 of the transmitter 802 from the receivers Rx1 804, Rx2 806, and Rx3 808 may be calculated using one of the methods 100, 120 and/or 300. By calculating the difference between TOAs (and, for example, by determining curves 810, 812 for which the difference of the distances from two receivers is constant), it is possible to localize the transmitter 802 in a coordinate system (e.g., a geographical coordinate system). A configuration session (e.g., using the method 110 and/or 500 and/or the device 430) may be performed. It is not strictly necessary that the transmitter that has performed the configuration session is the same of the transmitter 802 which is actually localized in the measurement session. The localization of the transmitter 802 may be performed, for example, by exchanging data (e.g., distances d1, d2, d3) between the receivers 804-808 and/or the transmitter 802. By calculating the correction data (advantageously on the basis of the pre-assigned configuration data 150), it is possible to increase the accuracy of the measurements.

Figure 8B:
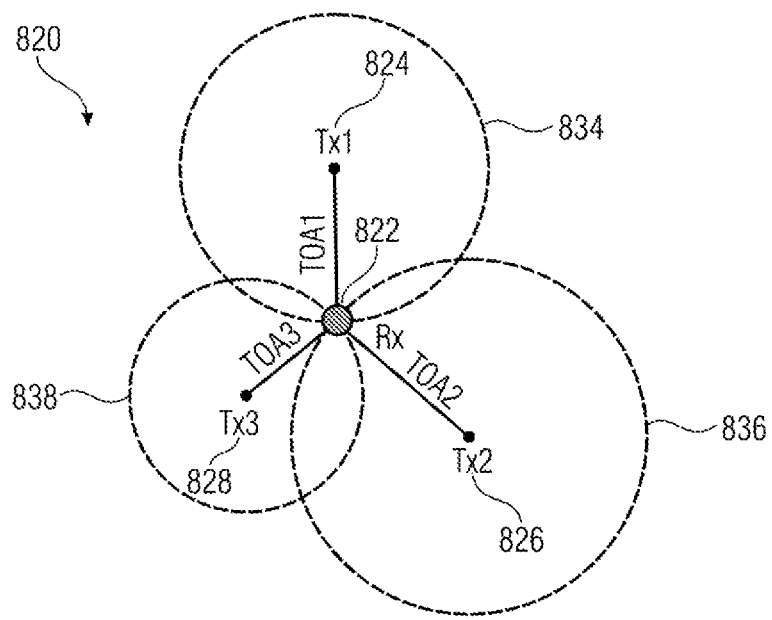
FIG. 8B shows a system according to an example.

FIG. 8B shows a positioning system 822 which may be a TOA positioning system. A receiver 822 (which may be, for example, a mobile phone, a mobile terminal, a smartphone, a localization device, or a similar apparatus) is to be localized. For example, the distances (e.g., indicated with 834, 836, 838) of the receiver 822 from at least three (advantageously at least four) transmitters Tx1 824, Tx2 826, Tx3 828 (which may be base station or devices at known positions), or in any case transmitters with known position) may be calculated. Accordingly, it is possible to retrieve the position (e.g., in geographical coordinates) of the receiver. The receiver 822 may be, for example, one of the devices 130, 160, or 430, and/or may perform any of the methods 100, 120, and 300. It is not necessary, in some examples, for the receiver 822 to also be the same receiver that has performed the configuration session. By calculating the correction data (advantageously on the basis of the pre-assigned configuration data 150 at a subsample resolution), it is possible to increase the accuracy of the measurements.

Figure 8C:
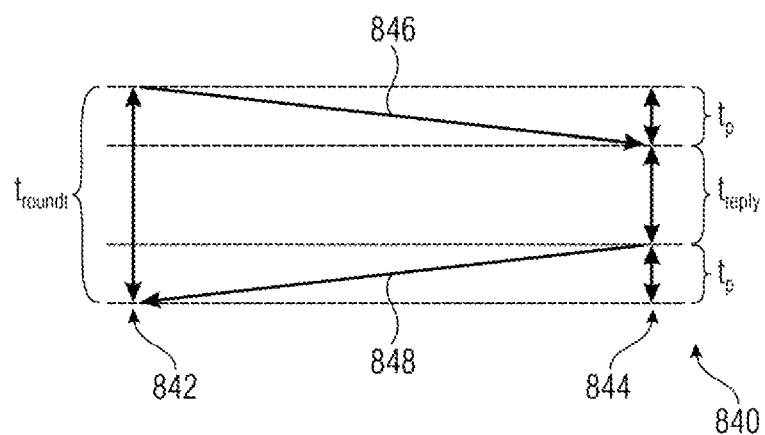
FIG. 8C shows a system according to an example.

FIG. 8C shows a round trip time (RTT) system 840 for measuring the distance between two devices 842 and 844 (e.g. mounted on satellites or at least one being mounted on a satellite). As can be seen from FIG. 8C, the round trip time $t_{roundt}$ may be obtained at least by a first transmission time $t_p$ for transmitting a first signal 846 from the device 842 to the device 844. A time delay $t_{reply}$ may elapse for permitting the processing to the device 844. A second transmission time $t_p$ for transmitting a second signal 848 from the device 844 to the device 842 (e.g., in response to the first signal 846) may also be calculated. It is possible to calculate $t_p$ from $t_{roundt}$ and $t_{reply}$ (e.g., by subtracting $t_{reply}$ from $t_{roundt}$ and subsequently dividing by 2) to obtain a time proportional to the distance between the devices 842 and 844. When calculating the distance between the devices 842 and 844, it is possible to use a method 100, 120, or 300. Therefore, when the first signal 846 is transmitted, the device 844 may be embodied by the device 130 and/or 160. Additionally or alternatively, when the second signal is transmitted, the device 846 may be embodied by the device 130 and/or 160. A configuration session may have been performed at a subsample resolution to prepare the configuration data for the devices 842, 846. By calculating the correction data (advantageously on the basis of the pre-assigned configuration data 150), it is possible to increase the accuracy of the measurements.

Figure 9:
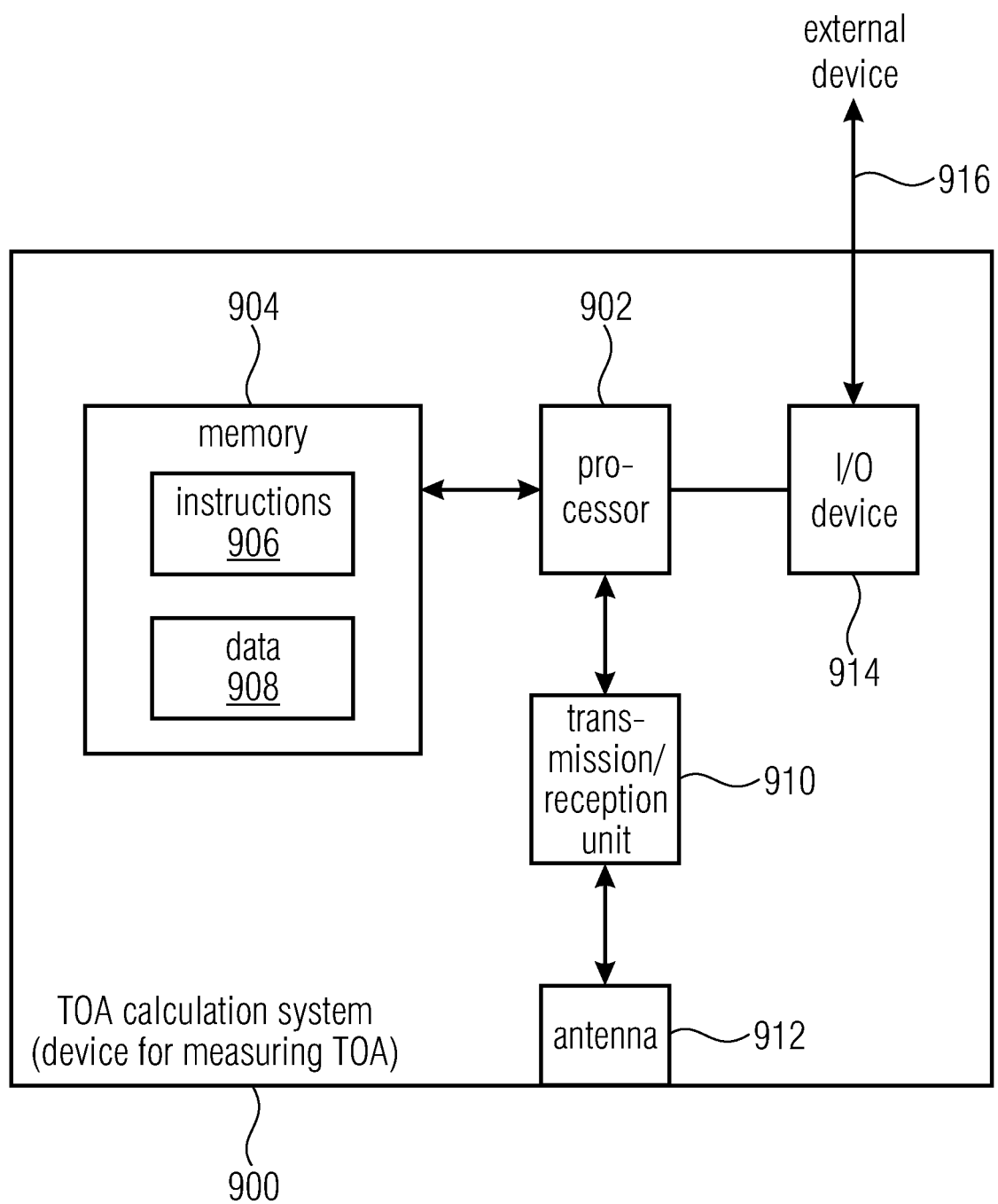
FIG. 9 shows a device according to an example.

FIG. 9 shows a device 900 (which may implement at least one of the devices 130, 160, 170, 430, 802-808, 822-828, 842, 844) comprising a processor 902 which may execute instructions. The device 900 may comprise a memory 904 which may comprise processor readable instructions 906 which, when performed by the processor 902, cause the processor 902 to perform one of the methods above (e.g., 100, 110, 120, 300, 500). The memory 904 may also contain data 908. The data 908 may contain, for example pre-assigned configuration data (e.g., data 150). When the device 900 implement a transmitter in the configuration session, the data 908 may contain location data, to be used for performing the configuration at a subsample resolution. The device 900 may comprise a transmission/reception unit 910 and an antenna 912, e.g., to perform the signal transmissions or receptions discussed above. The device 900 may comprise an input/output (I/O) device for communication of data to an external device (e.g., a communication network and/or a display device to communicate a result to a user) and/or for receiving selections from a user.

In view of the above, it is possible to see that a particular example may comprise:
A configuration session with:
Transmitting signals from a transmitter (e.g., step 502);
Computing correlations over K subsamples (e.g., step 506);
Computing for each subsample k a corrIndex(k) (e.g., step 508);
Projecting the corrIndex to the K subsamples (e.g., step 510) to obtain a fitting function (e.g., a continuous function);
Estimating the fitting coefficients a and b (e.g., step 512);
A subsequent measurement session with:
Receiving a signal from a transmitter whose distance is to be measured (e.g., step 302);
Estimate a coarse TOA and/or distance (e.g., step 504);
Compute a corrIndex (e.g., step 506);
Calculate correction data (Correction) a Correction=corrIndex/a−b/a
Correct the TOA using a linear combination between the estimated TOA (TOA_Coarse) and the correction data (Correction), for example according to a formula TOA_fine=TOA_Coarse+(Correction−K/2)K.

It is possible to implement any of methods and apparatus disclosed here in the context of a long term evolution, LTE, network, 4G, 5G, etc (but which may be also used in other environments). In examples, the receiver 130, 160, 802, 822, 842, and/or 844 may be a user equipment (UE), which is connected to a base station (BS) which may be an evolved node (eNB) and/or a gNB.

Figure 11:
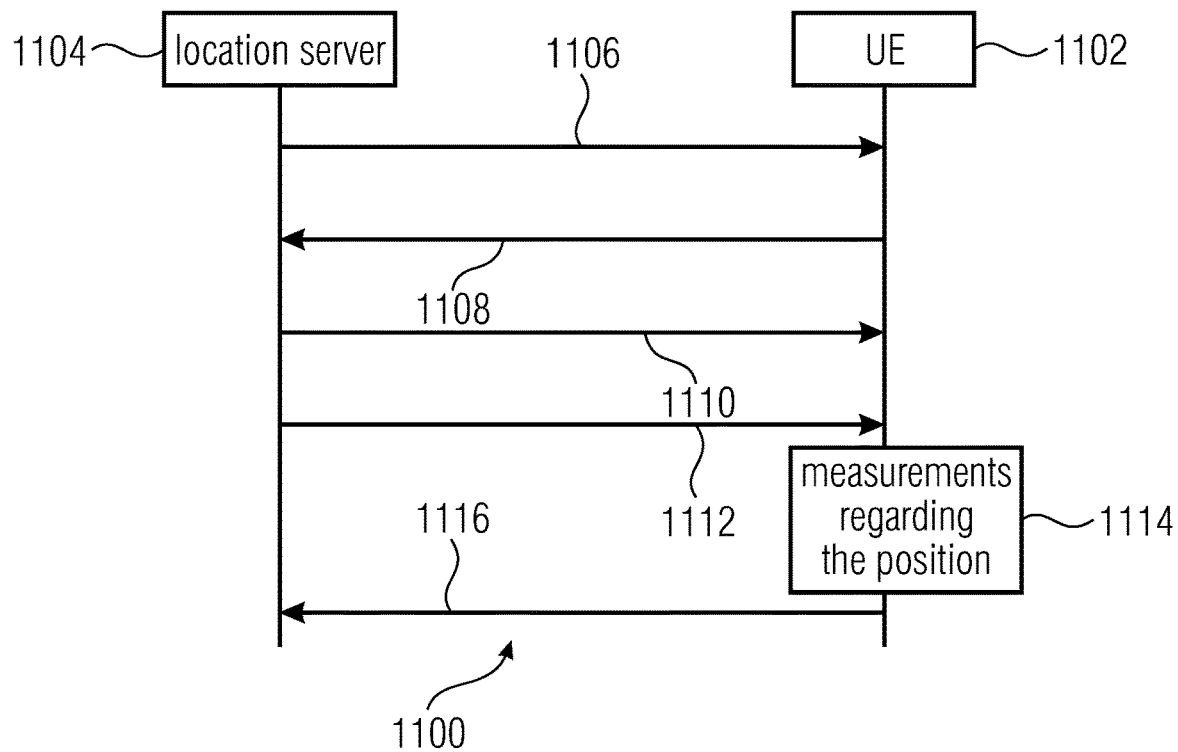
FIG. 11 shows a method according to an example.

FIG. 11 shows an example of method 1100 based on at least one of LTE, 45, 5G or another environment. The example may be based on an OTDOA (observed time difference of arrival) strategy. LTE currently supports reporting within a sample. The highest RSTD resolution reporting is set to 0.5*Ts which is equivalent to around 16.32 ns [1].

With the present example, it is possible to localize a user equipment, UE, 1102 (e.g., with respect to the location server 1104) in subsample resolution.

The location server 1104 (e.g., base station, eNB, gNB, etc.) may signal, at 1106, a request, such as "LPP request capabilities" (LTE Positioning Protocol=LPP, even if other protocols may be used). The UE 1102 may reply, e.g., by signalling an "LPP provide capabilities", at 1108. The location server 1104 may signal, at 1110, a request, such as "LPP provide assistance data". The location server 1110 may signal, at 1112, a request, such as "LPP request location information". In 1110 the location server may provide assistance information to the UE (for example which eNBs are in the UE region). In 1112, the server may request the location information, depending on the request options the UE sends it measurements. In 1110 (Location server provides assistance data to UE), the server can update or provide the UE with configuration data. In our case, the UE may provide the location server in 1108 that it is capable of performing high resolution measurements. If the UE is capable of making these measurements, the location server can request in 1112 that the UE provides the location information in subsample accuracy.

Figure 13:
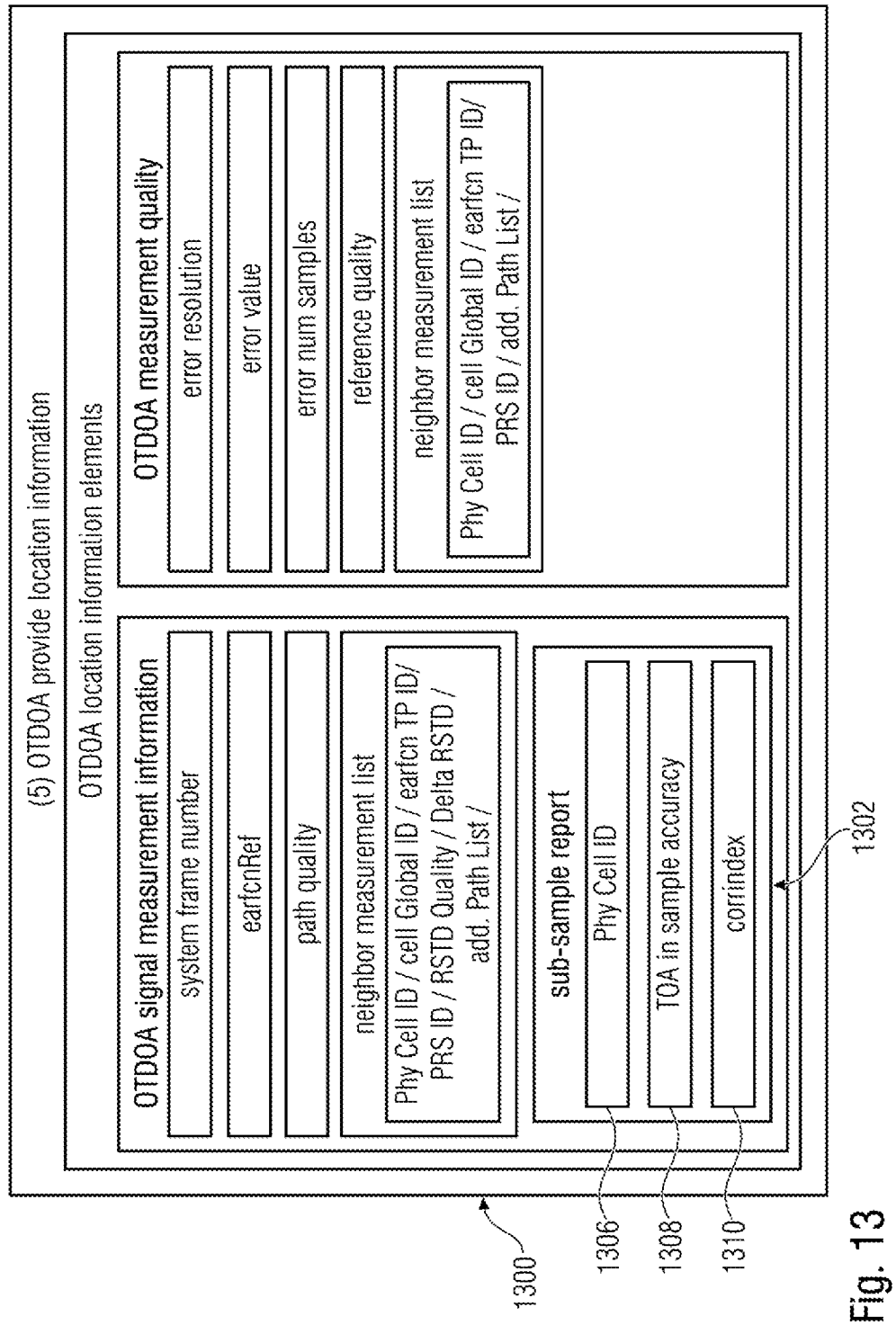
FIG. 13 shows a scheme according to an example.

The UE 1102 may perform measurements at 1114 regarding its position and, at 1116, signal a communication such as an "LPP provide location information", which may be as schema 1300 of FIG. 13 any which may comprise data 1302 "OTDOA signal measurement information", among which there may be, for example, the physical identifier 1306 of the eNB, and/or the respective TOA 1308 in sample accuracy (e.g., the estimated TOA 146), and/or the value corrIndex 1310 (or other information regarding the data from other samples, such as the sample preceding and the sample following the peak sample). In examples, the TOA may be measured for each eNB (or each location server or each base station), and the UE may report the ID of the base station which the TOA belongs to.

Figure 12:
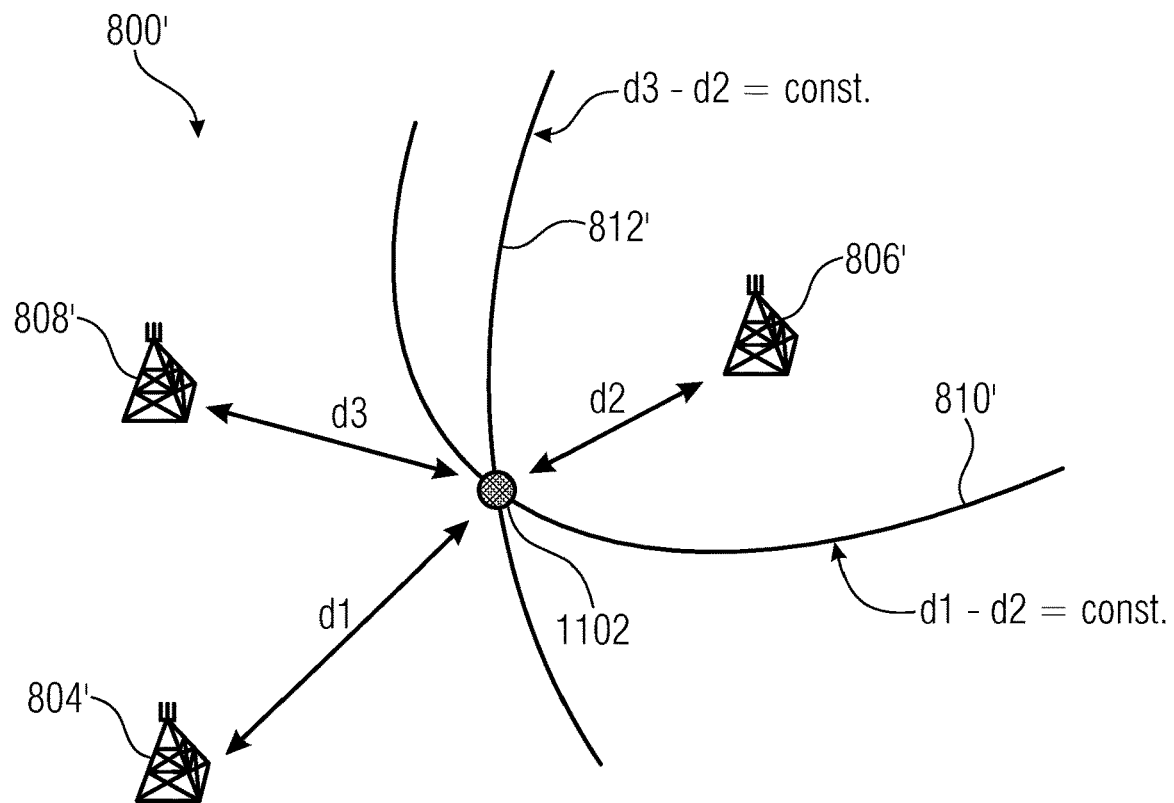
FIG. 12 shows a system according to an example.

At 1114, the UE 1102 may obtain data as above, e.g., by implementing steps 122, 124 (and, in case, also 126). The UE 1102 may operate, for example, as the device 130 (or at least as the components 134-138), 160, and/or 300. In some examples, the UE 1102 may operate by measuring TDOAs obtained by transmissions received from a plurality of base stations 806', 808', 812' as in FIG. 12 (in some examples, the location server 1104 is one of the base stations 806', 808', 812'). In some examples, TOAs (and not TDOAs) are transmitted. The location server 1104 can build TDOAs from the TOA measurements reported from the UE. The TOA corresponding to the distances d1, d2, d3 in FIG. 12 may be obtained by using one of the methods 100, 120, 300 and/or one of its steps. By obtaining the difference between TOAs (and, for example, by determining curves 810, 812 for which the difference of the distances from two receivers is constant), it is possible to localize the receiver 1102 in a coordinate system (e.g., a geographical coordinate system). A configuration session (e.g., using the method 110 and/or 500 and/or the device 430) may have been previously performed offline (also with different equipment and/or by simulation).

Accordingly, the UE 1102 may report its location, at 1116, e.g., in subsample resolution. The UE 1102 may measure the TOA from different base stations 806', 808', 812'. One base station is chosen as reference and the TOA may be obtained in subsample accuracy on the basis of the signal transmitted by the based station.

Other examples may be based also with signaling procedure which differ, at least partially, from at least some of the communications at 1100, and in particular the communications at 1106-1112.

Therefore, a UE 1102 requiring a high accuracy mode for ranging or positioning applications, may:
1) report the TOA measurement with correction data in subsampling accuracy; and/or
2) report, along with the TOA in samples, the additional samples preceding and/or following the peak sample values (e.g., normalized), and/or the main peak and/or the two additional samples preceding and/or following the peak sample (without normalization) and the value of the additional samples preceding and/or following the peak sample and/or data associated thereto, such as corrIndex.

With reference to the example 1), the UE 1102 may operate as the device 130 or 160 and/or perform all the steps of method 120 or 300, so as to provide the TOA measurement 156 in the subsample accuracy.

With reference to the example 2), the UE 1102 may transmit at least one (or a combination of):

the peak sample 140 (e.g., as determined at step 114), for example in normalized form;

the additional samples preceding and/or following the peak sample and/or data associated thereto 142 (e.g., in non-normalized form) (in other examples, other data, such as corrIndex, may be transmitted).

Then, the location server 1104 (in LTE or 5G, for example) can compute the TOA 156 based on the reports (e.g., the values 140 and/or 142 provided by the UE 1102) and prior information (such as the pre-assigned configuration data 150 obtained through a configuration session performed offline), the location server 1104 may estimate in subsamples the TOA. Therefore, in the example 2), at least some of the components 144, 148 and/or 154 of the device 130 may be in the location server 1104, while at least some of the components 134 and 136 may be in the UE 1102 (other configurations are possible). The example 2) is an example of the device 130 subdivided into two remote subdevices (the UE 1102 being a first subdevice and the location server 1104 being the second subdevice). Other different configurations are possible.

In examples according to protocols such as D2D (device-to-device) and/or V2V (vehicle-to-vehicle) or similar techniques, two different UEs (which may be the devices 842 and 844 of FIG. 8C) may obtain their mutual distance and report it to a base station. We need just one of the two devices capable of reporting the measurements in subsample resolution to the Location Server (1104). The reporting UE may send the peak sample or additional correlation values.

For ranging between two devices (D2D, V2V . . . ), the ranging devices can report the measurements to the location server, in coverage/RRC connected mode, that computes the range in high accuracy. For ranging between two devices (D2D, V2V . . . ), the ranging devices can report the measurements to the location server, in coverage/RRC connected mode, that computes the range in high accuracy.

Another example (FIG. 14) is obtained in the compensation of internal delays of a device 1400 (e.g., a full-duplex device) which may, for example, compensate for delays of the device. If the device is capable of computing the internal delays (or performing compensation-of-internal-delays), for example in full-duplex mode, the sent is received through the RF receiver chain the device can compute the calibration and report it separately, or report the TOA and subsample measurement, or compensate the TOA calibration measurement and report the subsamples. In alternative or addition, a device may also indicate its capability of calibrating the transceiver delays (calibration capability flag) to the location server, for example.

Figure 14:
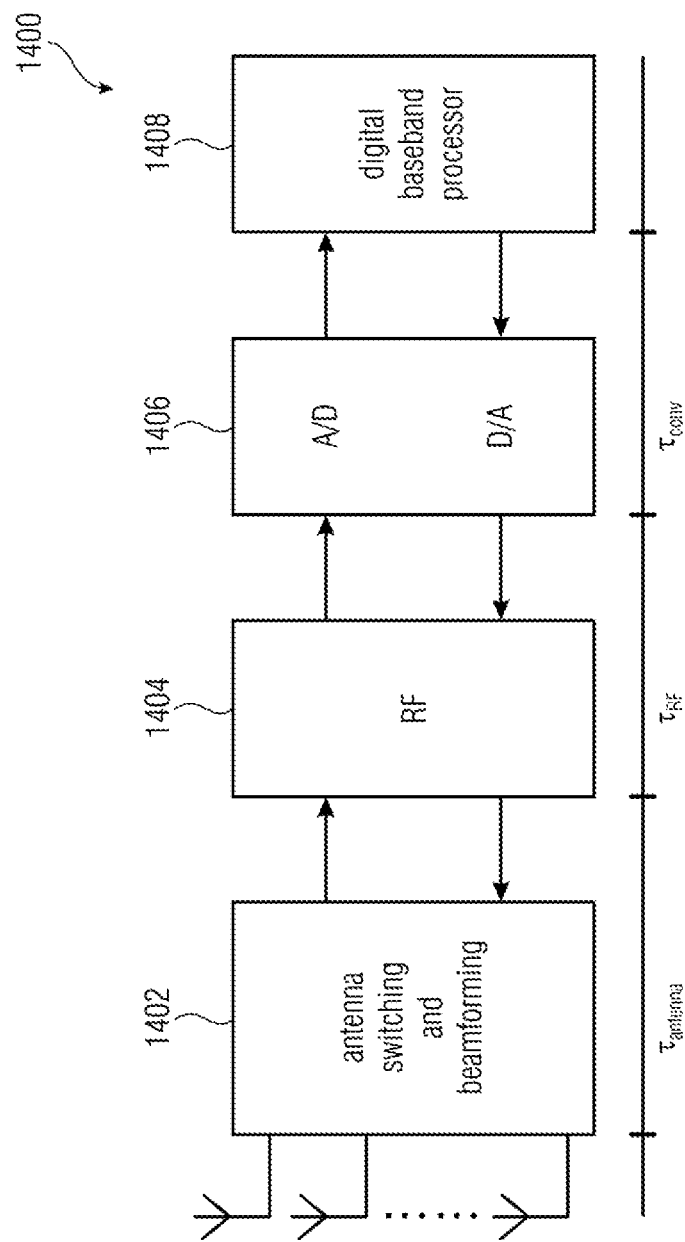
FIG. 14 shows an implementation according to an example.

As can be seen from FIG. 14, it is possible to keep into account the delays $\tau_{antenna}$ due to an antenna switching and beamforming block 1402, the delays τRF due to a transceiver 1404, the delays $\tau_{conv}$ due to the analog to a digital conversion and analog to digital conversion block 1406. These blocks may be connected in cascade to a digital baseband processor 1408 (which, in examples, may be the processor which controls the device 130 or 160). It is possible to obtain a value associated to $\tau_{antenna}+\tau_{RF}+\tau_{conv}$ by simultaneously transmitting and receiving the same signal.

$\tau_{antenna}$, τRF and $\tau_{conv}$ are transceiver delays. For positioning with one way approaches the difference (TDOA) may be built so that these delays cancel. If two-way ranging is applied the delays add an offset to measured range.

A device 1400 can use the high sampling accuracy approach to compensate and/or report the delays If the device is capable, for example in full duplex mode the sent is received through the RF receiver chain the device can compute the calibration and report it separately, or report the TOA and subsample measurement, or compensate the TOA calibration measurement (by performing the correction at block 154, for example) and report the subsamples.

Therefore, a full-duplex device performing the compensation-of-internal-delays process implements at the same time the transmitter and the receiver. The steps 122, 124, and 126 of the method 120 may be based, therefore, on the signal transmitted by the same full-duplex device. In this case, the TOA is not to be understood as being associated to a distance, but to the delays implied by the components (1402, 1404, 1406) of the full-duplex device 1400.

If the full-duplex device 1400 operates under LTE, 5G, etc., the device 1400 may also signal its internal delay to a base station (e.g., eNB, gNB, location node). In some cases, the full-duplex device 1400 may only implement the steps 122 and 124 and/or the elements 134 and 138, and signal the peak sample 140 and the data from other samples (e.g., the sample preceding and the sample following the peak) to the base station, which may, in turn implement the step 126 and/or the blocks 144, 146, and 150 (obtaining pre-assigned configuration data).

A receiver according to the invention is independent of the particular pulse shaping technique that it adopted (if any). Gaussian and root raised cosine (RRC) may be used, for example.

Discussion on the Examples

Time of arrival (TOA) estimate is fundamental for applications like ranging, positioning and time synchronization applications. The TOA is often derived from the correlation result between the received signal and a reference signal. The TOA can be directly be derived from the correlation peak the accuracy is however limited by the sampling rate. Hence a high resolution approach may be carried after the correlation to obtain sub-sample corrections. The profile of the correlation result is also dependent on the channel characteristics. These characteristics generate extra errors if not compensated or taken into account.

In addition to accuracy, the computational intensity plays an important role in the choice of the algorithm due to the limited resources on the target platform.

In the presence of a line of sight (LOS) signal reception, the correlation profile carries the time delay information that may be used to calculate the TOA. The correlation maximum provides a coarse TOA estimate in sample accuracy. To achieve higher accuracy, the initial TOA estimate has to be corrected in subsample resolution. FIGS. 2A and 2B show the ideal correlation profile in the dashed line and the computed correlation at the receiver side with sampling rate of 10 ns. In FIG. 2A the received signal is aligned with the reference signal (0°) and the resulting subsampling correction is hence zero. However with 180° phase difference as shown in FIG. 2B the detected maximum deviates from the ideal maximum with a Δd which is 1.5 m in this case.

The method proposed for estimating the subsample corrections may operate in two modes (sessions). In the first mode (configuration session) the effects of the channel and transmit sequence on the correlation profile are modeled. The second mode (measurement session) is the during operation: the subsample correction are estimated based on the modeled profile directly from the computed correlation at the receiver side.

The flowchart in FIG. 5A shows the offline operation in the first mode. A pulse shaped transmit sequence is sent over a channel. FIG. 5B shows a sequence shaped with an RRC filter (however any pulse shaped filter can be used for this method).

The channel in this scenario emulates the effect of time-delay on the received correlation profile. The next step correlation profile is collected over K subsamples as shown in FIG. 2C for time delays $k_1$ and $k_2$ within one sample. R(i,k) represents the correlation maximum between the received signal y and the reference signal x. R(i−1,k) and R(i+1,k) represents the points in correlation profile before and after the maximum respectively. R (i−1,k) and R (i+1,k) are collected over K correlations. For each k correlation diff_R (k) and sum_R (k) are computed, represented by:

$$\text{diff\_}R(k)=R(i+1,k)-R(i-1,k)$$

$$\text{sum\_}R(k)=R(i+1,k)+R(i-1,k)$$

The index corrIndex(k) is then computed as corrIndex(k) =diff_$R_{xy}$(k)/sum_$R_{xy}$(k). FIG. 6A shows the index corrIndex(k) for K=1000. In some cases quadratic fitting might be more suitable.

During operation, or in the second mode (measurement session), the digital receiver can correct the TOA using the coefficients a and b in the above case. The subsample correction is simply computed as $$corrIndex = \frac{\text{diff\_R}}{\text{sum\_R}}$$

and lastly the fine TOA measurement is obtained by linearly modifying the correction to the initial coarse TOA. For example, the following formula may be used:

$$\text{TOA\_fine}=\text{TOA\_coarse}+(\text{Correction}-K/2)/K.$$

K may be a fixed value. For example, K may be the number of subsamples (correlations calculated in the configuration session).

Therefore, it is possible to resume that TOA, which is often fundamental for distance for measurements, may be normally estimated by means of a cross-correlation between a received signal and a reference signal. The sample accuracy is not often sufficient for applications like positioning and ranging. The current methods are inaccurate or have a high computational complexity. The present methods target small devices because of the low complexity and the accurate extraction of the TOA form one snapshot given that the correlation profile is not distorted.

Two modes of operations may be executed: offline mode (configuration session) and operation mode (measurement session). In the offline mode the mapping of the correlation profile to the corresponding time delay is performed, and later, fitted to an algebraic equation. This procedure may be performed once. In the operation mode (measurement session) the receiver calculates the correlation profile index and solvers the algebraic equations to perform measurement sin the subsample accuracy. A last step in the TOA measurements may be corrected by subsample corrections.

Further Implementations

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, some one or more of the most important method steps may be executed by such an apparatus.

Depending on certain implementation requirements, examples can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples can be implemented as a computer program product with a program code, the program code being operative for performing one of the methods when the computer program product runs on a computer. The program code may for example be stored on a machine readable carrier.

Other example comprise the computer program for performing one of the methods described herein, stored on a machine readable carrier.

In other words, an example of the inventive method is, therefore, a computer program having a program code for performing one of the methods described herein, when the computer program runs on a computer.

A further example of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further example of the inventive method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Technical Specification 36.355 3GPP LTE Positioning Protocol (LPP) (Release 13) 3rd Generation Partnership Project, 3rd Generation Partnership Project, 2016
[2] S. Fischer, "Observed Time Difference Of Arrival (OT-DOA) positioning in 3GPP LTE", Qualcomm White Pap, vol. 1, pp. 1-62, June 2014 Second.

The invention claimed is:

1. A method for time of arrival, TOA, measurements in a transmission channel, the method comprising a configuration session and a measurement session:
the configuration session comprising:
performing a plurality of cross-correlation processes for a plurality of configuration signals to achieve multiple configuration cross-correlation functions associated with different distances;
for each configuration cross-correlation process, determining a peak sample and data of at least one sample preceding and one sample following the peak sample for each cross-correlation; and
associating configuration data with the transmission channel,
the measurement session comprising:
performing a cross-correlation process, on a received measurement signal, with a reference signal, to achieve a measurement cross-correlation function;
determining a peak sample and cross-correlation data of at least one additional sample preceding and at least one additional sample following the peak sample in the measurement cross-correlation function;
determining a TOA measurement on the basis of:
the peak sample: and
correction data obtained from:
the cross-correlation data of the at least one additional sample preceding and at least one additional sample following the peak sample: and
the configuration data associated with the transmission channel,
wherein in the configuration session the plurality of configuration signals are taken at a resolution higher than a sample resolution bound to a sampling time at which the received signal is sampled during the measurement session.

2. The method of claim 1, further comprising transforming the cross-correlation data of the at least one additional sample preceding and at least one additional sample following the peak sample according to a transformation function.

3. The method of claim 1, wherein the configuration session acquires a plurality of data from configuration signals received which have different time delays, to acquire configuration data in association with time delays.

4. The method of claim 1, further comprising performing a transmission from a transmitter in movement so as to acquire different configuration signals associated with different TOAs at the receiver.

5. The method of claim 1, wherein the at least one additional sample preceding and at least one additional sample following the peak sample comprise at least the sample immediately preceding the peak sample, and at least the sample immediately following the peak sample.

6. The method of claim 1, further comprising, when determining the cross-correlation data of at least one sample preceding and at least one additional sample following the peak sample, measuring the difference between the cross-correlation value of a sample preceding the peak sample with the cross-correlation value of a sample following the peak sample, and
calculating a ratio between:
the difference between the cross-correlation value of a sample following the peak sample and the cross-correlation value of a sample preceding the peak sample; and
the sum of the cross-correlation value of a sample following the peak sample and the cross-correlation value of a sample preceding the peak sample.

7. The method of claim 1, further comprising, in the configuration session:
measuring the difference between the cross-correlation value of a sample preceding the peak sample with the cross-correlation value of a sample following the peak sample, and
calculating a ratio between:
the difference between the cross-correlation value of the sample following the peak sample and the cross-correlation value of the sample preceding the peak sample; and
the sum of the cross-correlation value of the sample following the peak sample and the cross-correlation value of the sample preceding the peak sample.

8. The method of claim 1, further comprising:
in the configuration session, achieving a linear function, the linear function having an angular coefficient by:
measuring the difference between the cross-correlation value of a sample preceding the peak sample with the cross-correlation value of a sample following the peak sample, and
calculating a first ratio between:
the difference between the cross-correlation value of the sample following the peak sample and the cross-correlation value of the sample preceding the peak sample; and
the sum of the cross-correlation value of the sample following the peak sample and the cross-correlation value of the sample preceding the peak sample; and
when determining the cross-correlation data of at least one sample preceding and at least one additional sample following the peak sample,
measuring the difference between the cross-correlation value of a sample preceding the peak sample with the cross-correlation value of a sample following the peak sample, and
calculating a second ratio between:
the difference between the cross-correlation value of a sample following the peak sample and the cross-correlation value of a sample preceding the peak sample; and the sum of the cross-correlation value of a sample following the peak sample and the cross-correlation value of a sample preceding the peak sample, further comprising scaling the second ratio by a value associated with the angular coefficient of the linear function.

9. The method of claim 8, further comprising correcting the estimated TOA with a value associated with the scaled second ratio.

10. The method of claim 1, for performing a time difference of arrival, TDOA, measurement, the method comprising measuring a first TOA for a first transmission from a transmitter towards a first receiver, a second TOA for a second transmission from the transmitter towards a second receiver, and measuring a TDOA by subtracting the first TOA from the second TOA.

11. The method of claim 1, further comprising acquiring the configuration data from a fitting function and/or a linear function and/or a quadratic function.

12. The method of claim 1, further comprising collecting the configuration data from a plurality of TOAs obtained from signals received from a transmitting device sending transmissions from a plurality of distances, whose differences are smaller than the measurement resolution associated with the sampling rate, to adapt to the transmission channel to the cross-correlation data associated with the samples preceding and following the peak sample.

13. The method of claim 1, wherein the configuration data comprise a linear or quadratic function.

14. The method of claim 13, wherein the linear or quadratic function is achieved by inference, interpolation, or least square method.

15. The method of claim 13, wherein the linear or quadratic function transforms data from a measurement correlation function.

16. The method of claim 14, wherein the configuration data comprise a slope of a linear function.

17. The method of claim 1, wherein performing and determining a peak sample and cross-correlation data of at least one additional sample preceding and at least one additional sample following the peak sample in the measurement cross-correlation function are performed by a first device, and determining a distance is performed by a remote device.

18. The method of claim 17, wherein the first device is a user equipment, UE, and the second device is a location server, or a base station, or a evolved node, eNB, or a next generation node, gNB.

19. The method of claim 1 for performing a time difference of arrival, TDOA, measurement, the method comprising measuring a first TOA of a first transmission from a first base station towards a receiver, a second TOA of a second transmission from a second base station towards the receiver, and measuring a TDOA by subtracting the first TOA from the second TOA.

20. The method of claim 1, using a full-duplex communication device, the method comprising, before performing the cross-correlation process, transmitting and receiving the transmitted signal in a full-duplex operation; and, after determining the TOA, acquiring the delays associated with internal components of the full-duplex communication device.

21. The method of claim 20, further comprising compensating the internal delays of the full-duplex communication device.

22. A device for estimating a time of arrival, TOA, the device comprising:

a TOA estimation unit for estimating, during a measurement session, at sample resolution, a TOA from a position of a peak in a cross-correlation function achieved by processing a received signal, with a reference signal, wherein the sample resolution is associated with the sampling time at which the received signal is sampled;

a correction unit to modify the estimated TOA on the basis of at least cross-correlation data of the samples preceding and following the sample with the maximum value of the cross-correlation function and configuration data;

a cross-correlation unit to cross-correlate the received measurement signal with a reference signal to achieve a configuration cross-correlation function;

a sample determination unit to determine a peak sample of the measurement cross-correlation function and data from other samples, comprising a sample preceding the peak sample and/or a sample following the peak sample; and a configuration data definition unit to determine the peak sample and the other samples to provide configuration data, the configuration data being acquired during a configuration session comprising:

performing, by the cross-correlation unit, a plurality of cross-correlation processes for a plurality of configuration signals to achieve multiple configuration cross-correlation functions associated with different transmitter's positions within a maximum interval less than the sample resolution bound to the sampling time;

for each configuration cross-correlation process, determining, by the sample determination unit, a peak sample and data of one sample preceding and one sample following the peak sample for each cross-correlation; and associating, by the configuration data definition unit, configuration data with the transmission channel to acquire the configuration data.

23. The device of claim 22, further configured so that the at least one additional sample preceding and following the peak sample comprises at least the sample immediately preceding the peak sample and at least the sample immediately following the peak sample.

24. The device of claim 22, further configured for acquiring the configuration data from a fitting function and/or a linear function and/or a quadratic function.

25. The device of claim 22, further configured for collecting the configuration data from a plurality of TOAs obtained from signals received from a transmitter at mutual distances smaller than the sample resolution associated with the sampling rate, to adapt to the transmission channel to the cross-correlation data associated with the samples preceding and following the peak sample.

26. The device of claim 22, configured for measuring TDOAs acquired by transmissions received from a plurality of base stations.

27. A non-transitory digital storage medium having a computer program stored thereon to perform a method for time of arrival, TOA, measurements, said method comprising a configuration session and a measurement session, wherein the measurement session comprises:

performing, at a sample resolution, a cross-correlation process on a received measurement signal to achieve a measurement cross-correlation function;

determining a peak sample and cross-correlation data of at least one additional sample preceding and following the peak sample in the measurement cross-correlation function determining a TOA on the basis of the peak sample and correction data acquired by at least the cross-correlation data of the at least one additional sample preceding and following the peak sample and configuration data associated with the transmission channel, wherein the configuration session comprises:
- performing a plurality of cross-correlation processes for a plurality of configuration signals to achieve multiple configuration cross-correlation functions associated with different transmitter's positions within a maximum interval less than the sample resolution bound to a sampling time at which the received signal is sampled during the measurement session,
- for each configuration cross-correlation process, determining the peak sample and data of at least one sample preceding and one sample following the peak sample for each cross-correlation; and
- associating configuration data with the transmission channel, when said computer program is run by a computer.

* * * * *